United States Patent
Kaiya et al.

(10) Patent No.: US 8,645,649 B2
(45) Date of Patent: Feb. 4, 2014

(54) COMPUTER SYSTEM WITH RESERVATION CONTROL

(75) Inventors: Keiichi Kaiya, Hadano (JP); Noboru Furuumi, Yokohama (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 13/264,838

(22) PCT Filed: Sep. 29, 2011

(86) PCT No.: PCT/JP2011/005517
§ 371 (c)(1),
(2), (4) Date: Oct. 17, 2011

(87) PCT Pub. No.: WO2013/046273
PCT Pub. Date: Apr. 4, 2013

(65) Prior Publication Data
US 2013/0086349 A1  Apr. 4, 2013

(51) Int. Cl.
*G06F 17/30* (2006.01)
*G06F 12/00* (2006.01)

(52) U.S. Cl.
USPC ....... 711/162; 707/999.24; 711/154; 711/164

(58) Field of Classification Search
USPC .................... 707/999.204; 711/162, 154, 164
See application file for complete search history.

(56) References Cited

U.S. PATENT DOCUMENTS

| 6,304,980 | B1 | 10/2001 | Beardsley et al. | |
|---|---|---|---|---|
| 2007/0214317 | A1* | 9/2007 | Kalos et al. | 711/114 |
| 2009/0049241 | A1* | 2/2009 | Ohno et al. | 711/114 |
| 2009/0063892 | A1 | 3/2009 | Abdulvahid et al. | |
| 2010/0250886 | A1* | 9/2010 | Eguchi et al. | 711/162 |
| 2012/0246429 | A1* | 9/2012 | Arakawa et al. | 711/162 |
| 2013/0024635 | A1* | 1/2013 | Araki | 711/162 |
| 2013/0067183 | A1* | 3/2013 | Satoyama et al. | 711/162 |

FOREIGN PATENT DOCUMENTS

WO  2010106579 A1  9/2010

OTHER PUBLICATIONS

T10 Techinical Committee et al, "SCSI Primary Commands-3 Revision 23", vol. dpANS, No. T10/1416-D, May 4, 2005, pp. I-XXV,1.

* cited by examiner

*Primary Examiner* — Reginald Bragdon
*Assistant Examiner* — Mehdi Namazi
(74) *Attorney, Agent, or Firm* — Volpe and Koenig, P.C.

(57) ABSTRACT

A computer system includes: a first storage apparatus; a second storage apparatus; a first volume of the first storage apparatus; and a second volume of the second storage apparatus; wherein the first volume and the second volume have a copy pair relationship and a host system recognizes the second volume as the same volume as the first volume; and wherein the first storage apparatus sends reservation information of the first volume to the second storage apparatus; and the second storage apparatus controls access from the host system on the basis of the received reservation information.

9 Claims, 30 Drawing Sheets

FIG.5

| QVOL ID | APPARATUS 1 S/N | APPARATUS 2 S/N | LOCK INFORMATION BITMAP | |
|---|---|---|---|---|
| | | | APPARATUS 1 LOCK LU | APPARATUS 2 LOCK LU |
| 0x00 | 64036 | 64016 | 0000011111000000000000000 | 0000000000011111111111111 |
| 0x01 | | | | |
| .. | .. | | | |

| LDEV | TARGET PORT 602 | INITIATOR PORT (WWN) 604 | RESERVATION VALID FLAG 606 | |
|---|---|---|---|---|
| 0000 | 00 | 50060e80 12345678 | Valid | RESERVATION EXISTS IN ITS OWN APPARATUS |
| 0001 | 01 | 50060e80 abcd1234 | Invalid | |
| 0002 | FF | 50060e80 ffaabbcc | Valid | RESERVATION EXISTS IN THE OTHER APPARATUS |

| LDEV | Generation | Reservation Key | VOL | Scope-specific address | Scope | Type |
|------|------------|-----------------|------|------------------------|-------|------|
| 0000 | 00000030   | Initiator123    | PVOL | 0                      | 0     | Write Exclusive |
| 0001 | 00000002   | HOST3           | PVOL | 0                      | 0     | Exclusive Access |
|      |            |                 |      |                        |       |      |

| LU(OWN APPARATUS LU#) | TARGET PORT | INITIATOR PORT | RESERVATION KEY |
|---|---|---|---|
| 0000 | 00 | 50060e80 12345611 | Initiator123 |
| 0000 | 00 | 50060e80 12345600 | Initiator123 |
| 0000 | 01 | 50060e80 12345611 | Initiator123 |
| 0000 | 01 | 50060e80 12345600 | Initiator123 |

| LU(OWN APPARATUS LU#) | TARGET PORT (THE OTHER APPARATUS) | INITIATOR PORT (THE OTHER APPARATUS) | RESERVATION KEY |
|---|---|---|---|
| 0000 | 00 | 50060e80 12345622 | Initiator123 |
| 0000 | 01 | 50060e80 12345633 | Initiator123 |
| 0000 | 02 | 50112233 12345611 | OtherServer |
| 0000 | 03 | 50112233 12345622 | OtherServer |

(800) (802) (804) (806)

| COMMAND CODE |
| --- |
| TRANSFER DESTINATION LU# |
| PR REQUEST TARGET PORT |
| PR REQUEST INITIATOR PORT |
| ReservationKey |
| Type |
| ServiceAction |
| Service Action ReservationKey |

COMPUTER SYSTEM WITH RESERVATION CONTROL

TECHNICAL FIELD

The present invention relates to a computer system. Particularly, the invention relates to a computer system in which copy pairs of a plurality of volumes are formed between a first storage apparatus and a second storage apparatus and the plurality of volumes having a copy pair relationship are presented as the same volume to a host system.

BACKGROUND ART

A computer system in which a plurality of storage apparatuses are formed as a cluster is known from a viewpoint of enhancement of reliability of the system against failures. This computer system is designed to realize dual data storage by connecting the plurality of storage apparatuses.

Specifically speaking, a copy pair relationship is established between a volume of a storage apparatus constituting a first site and a volume of a storage apparatus constituting a second site; and one volume becomes a primary volume and the other volume becomes a secondary volume. At normal times, a host system accesses the primary volume and write data to the primary volume is synchronously copied to the secondary volume, thereby realizing dual data storage.

The host system recognizes the secondary volume as the same volume as the primary volume. So, when the host system cannot access the primary volume due to whatever reason, the host system switches a path to the secondary volume at the second site and continues writing data to the secondary volume. This type of computer system is described in, for example, WO 2010/106579.

CITATION LIST

Patent Literature

PTL 1: WO 2010/106579

SUMMARY OF INVENTION

Technical Problem

When one logical volume is shared by a plurality of host systems, an exclusive control system for preventing simultaneous access from the plurality of host systems to one logical volume is known as a means for maintaining data integrity. This exclusive control system is designed so that when a host system which has sent a reservation command to a logical volume is made to reserve the logical volume, other host systems cannot access the reserved logical volume.

Meanwhile, although the host systems in the conventional cluster storage system recognize the primary volume and the secondary volume as the same logical volume, the conventional cluster storage system has a problem that even when a reservation command is issued to the primary volume recognized by the host system, the secondary volume cannot be reserved at the same time as the reservation of the primary volume.

The secondary volume cannot be reserved because the reservation is managed by a combination of an initiator port, a target port, and a volume identifier; and even if the secondary volume is recognized by the host system as the same logical volume as the primary volume, a combination of the initiator port, the target port, and the volume identifier for the primary volume is different from those for the secondary volume.

As a result, the resulting problem is that the secondary volume can be accessed by other host systems; or when a switching path program of the host system switches from a path from a port to the primary volume at the first site to a port to the secondary volume at the second site, the host computer cannot use the secondary volume exclusively.

So, it is an object of the present invention to provide a computer system capable of reliably setting the setting of reservation to each of logical volumes at the plurality of sites where the logical volumes having the copy pair relationship at the plurality of sites are recognized as the same logical volume by the host computer.

Solution to Problem

In order to achieve the above-described object, a computer system according to the present invention is characterized in that between a plurality of storage apparatuses where a plurality of logical volumes have a copy pair relationship, a host system transfers reservation information for a logical volume of one storage apparatus to another storage apparatus having the other logical volume.

Advantageous Effects of Invention

According to the present invention, it is possible to provide a computer system capable of reliably setting the setting of reservation to each of logical volumes at the plurality of sites where the logical volumes having the copy pair relationship at the plurality of sites are recognized as the same logical volume by the host computer.

BRIEF DESCRIPTION OF DRAWINGS

FIG. 5 is an example of a quorum volume ownership management table.

FIG. 6 is an example of a reservation management table.

FIG. 7 is an example of a persistent reservation management table.

FIG. 8A is an example of a first persistent reservation key registration table.

FIG. 8B is an example of a second persistent reservation key registration table.

DESCRIPTION OF EMBODIMENTS

Figure 1:
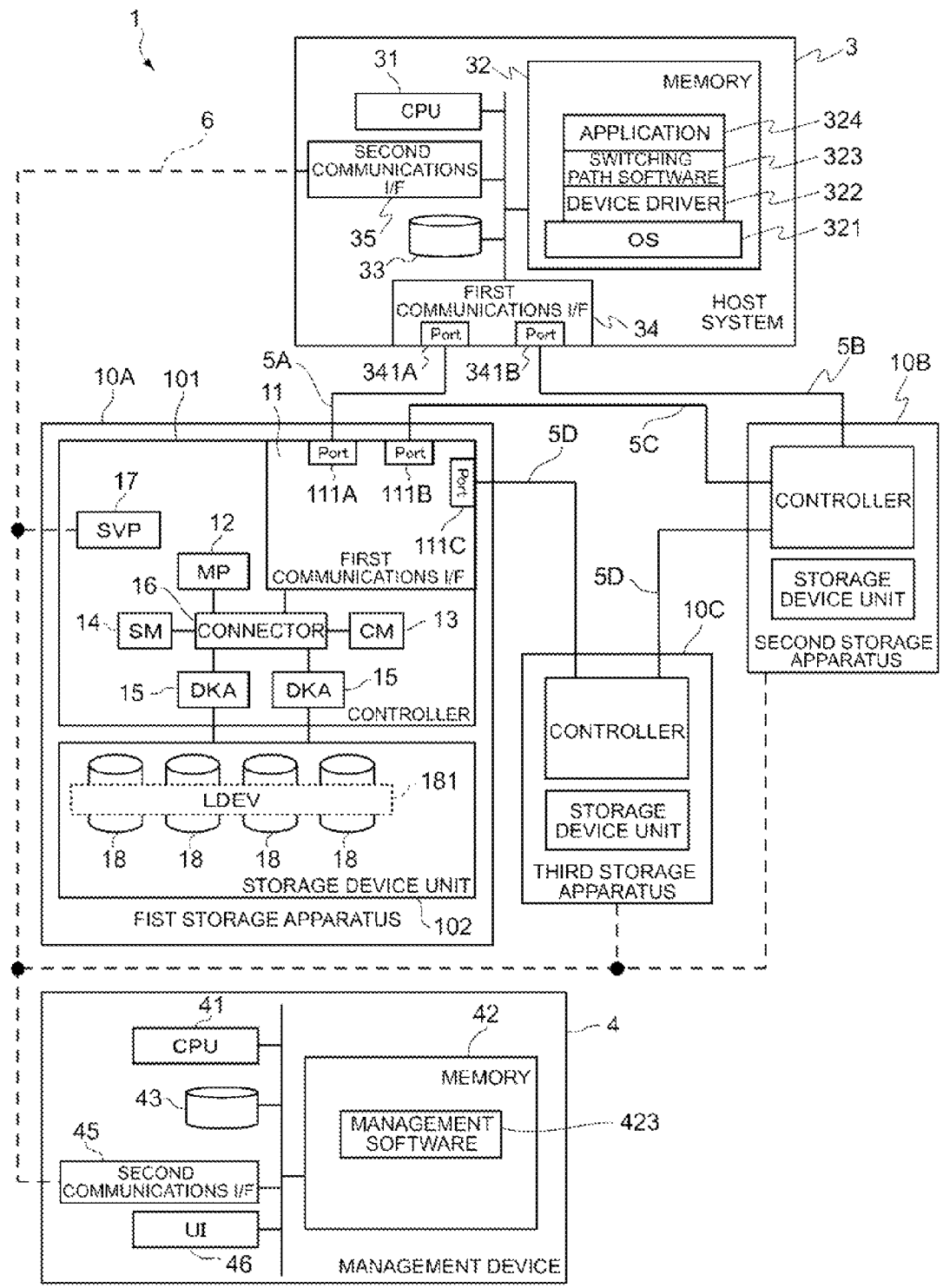
FIG. 1 is a hardware block diagram of a computer system according to an embodiment of the present invention.

Next, an embodiment of the present invention will be explained. FIG. 1 is a hardware block diagram of a computer system according to an embodiment of the present invention. The reference numeral 1 represents a computer system according to this embodiment. This computer system 1 includes a host system 3, a first storage apparatus 10A, and a second storage apparatus 10B. The first storage apparatus 10A constitutes an online system apparatus, while the second storage apparatus constitutes a standby system apparatus.

The host system 3 is connected via, for example, FC (Fibre Channel) networks 5A, 5B to the first and second storage apparatuses 10A, 10B and the first and second storage apparatuses 10A, 10B are connected to each other via, for example, an FC cable 5C. Furthermore, a third storage apparatus 10C is externally connected to the first storage apparatus 10A and the second storage apparatus 10B via for example, an FC cable 5D.

The host system 3 is a computer device including a CPU (Central Processing Unit) 31, a memory 32, a local hard disk 33, a first communications interface 34, and a second communications interface 35 and is composed of, for example, a personal computer device, a workstation, or a mainframe.

The host system 3 includes information input devices (not shown) such as a keyboard, a switch, a pointing device, and a microphone and information output devices (not shown) such as a monitor display and a speaker. The reference numeral 341A represents an initiator port connected to a target port 111A of the first storage apparatus 10A and the reference numeral 341B represents an initiator port connected to a target port of the second storage apparatus 10B.

The memory 32 stores an application program 324 for the host system 3 to perform operations, a switching path program 323 for managing path switching (switching path) from the host system 3 to the storage apparatus 10A or 10B, a device driver program 322 for the host system 3 to control the storage apparatus 10A or 10B, and an OS 321.

The first storage apparatus 10A is constituted from a storage device unit 102, including a plurality of storage devices 18, and a controller 101 for controlling data input to or output from the storage devices. The same basic configuration is also used in the second storage apparatus 10B and the third storage apparatus 10C.

The storage devices 18 are composed of expensive disks such as FC disks or inexpensive disks such as SATA (Serial AT Attachment) disks. One or more storage devices 18 constitute a RAID group and one or more logical volumes (LDEV) 181 are set in a storage area provided by one RAID group. Then, data is stored in block units of a specified size in the LDEV(s).

Each logical volume LDEV is assigned a unique identifier (volume number). The host system 3 executes write or read access to a logical volume of the storage apparatus by designating the volume number.

The controller 101 includes a communications interface 11, a microprocessor 12, a cache memory (CM) 13, a shared memory (SM) 14, and a disk adapter 15; and these devices are connected to each other via a connector 16, so that they can deliver or receive data and commands to each other. Incidentally, the reference numeral 17 represents a management processor (SVP) that communicates with the management device 4. The connector 16 is composed of, for example, a switch or bus such as a very high speed crossbar switch for transferring data by means of high-speed switching.

The communications interface 11 includes: a target port 111A to which a path from the host system 3 is to be connected; an initiator port or target port 111B to which a path to a target or initiator port of the second storage apparatus 10B is to be connected; and an external port 111C to which a path to the external storage apparatus 10C is to be connected.

The microprocessor 12 interprets and executes commands sent from the host system or other storage apparatuses on the basis of a control program stored in a memory provided therein.

The cache memory 13 is a memory shared by, for example, the microprocessor 12. The cache memory 13 is mainly used to temporarily store data input to or output from the logical volumes.

The shared memory 14 is configured by logically dividing part of the cache memory 13 or is configured as a separate semiconductor memory from the cache memory 13; and information such as configuration information of the storage apparatus (management and control tables) is stored in the shared memory 14.

The disk adapter 15 is configured as a microcomputer system equipped with, for example, a microprocessor and a memory and functions as an interface for performing protocol control when communicating with each storage device 18. The disk adapter is connected to the corresponding storage devices 18 via, for example, an FC cable and receives data from and/or sends data to the storage devices 18 in accordance with FC protocol.

The management device 4 exists in the computer system 1 and the management device 4 is connected via communications interfaces to the host system 3, the first storage apparatus 10A, the second storage apparatus 10B, and the third storage apparatus 10C and applies management processing on theses apparatuses.

The management device 4 includes a CPU 41, a local disk 43, a communications interface 45, a user interface (UI) 46, and a memory 42 storing management software 423.

Figure 2:
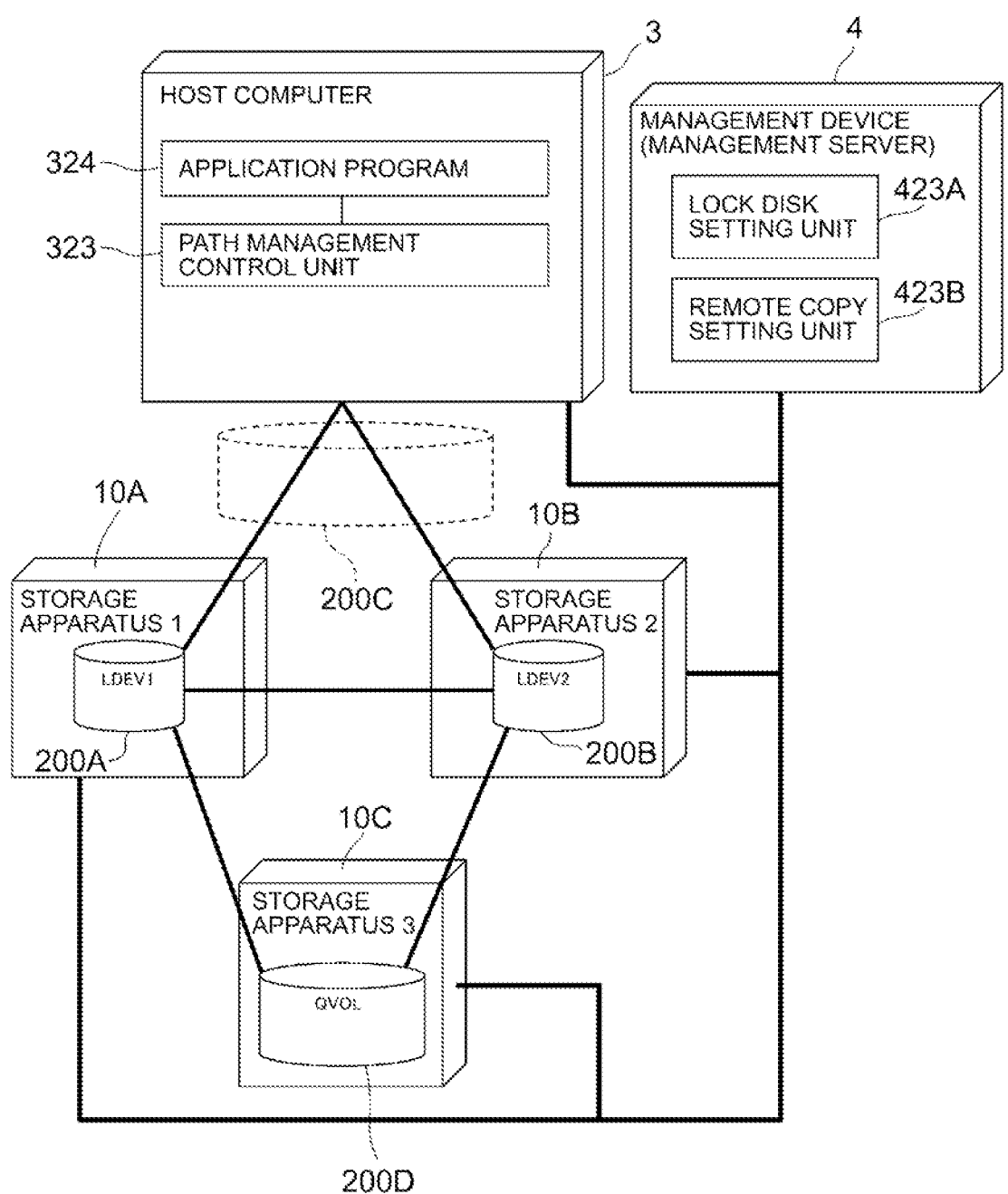
FIG. 2 is a logical bock diagram of a cluster structure of the computer system in FIG. 1.

FIG. 2 is a logical block diagram of a cluster structure of the computer system in FIG. 1. This structure is commonly called a HAM (High Ability Manager), meaning that it provides the host system with a higher-level management function (The first storage apparatus 10A constitutes an online system site and the second storage apparatus 10B constitutes a standby system apparatus. The first storage apparatus 10A has a primary volume (LDEV1) and the second storage apparatus 10B has a secondary volume (LDEV2) having a pair relationship with the primary volume. When the host system 3 makes write access to the primary volume at the online system site, the first storage apparatus 10A synchronously copies write data to the secondary volume.

When the system is initialized, the first storage apparatus 10A returns the ID (LDEV1) of the primary volume 200A and the second storage apparatus 10B refers to a volume pair information table and returns the ID (LDEV11) of the primary volume, with which its secondary volume 200B has a copy pair relationship, but not the ID (LDEV22) of the secondary volume 200B, in response to an inquiry command from the host system 3. As a result, the host system 3 recognizes that the secondary volume exists along a separate path from the path for the primary volume; and also recognizes the secondary volume as the same logical storage area 200C (LDEV or LU [Logical Unit]) as the primary volume. In other words, the first storage apparatus 10A and the second storage apparatus 10B act before the host system as if they were logically one storage apparatus. The HAM guarantees the identity of the primary volume and the secondary volume; and even if a failure occurs in one of the pair of storage apparatuses, the HAM secures the host system the continuation of operations by the other storage apparatus.

After the first storage apparatus 10A transfers write data, which was received by the primary volume 200A from the host system, to the secondary volume 200B, it returns a good response to the host system 3. If both the logical volumes are in the above-described pair status, the host system 3 accesses only the primary volume 200A. If the online system site 10A stops due to, for example, damage by disasters, the switching path program (path management control unit) 323 of the host system 3 switches from a path to the primary volume 200A at the online system site 10A to a path to the secondary volume 200B at the standby system site 10B.

The management software 423 of the management device (management server) 4 constitutes a lock disk setting unit 423A and a remote copy setting unit 423B. The lock disk setting unit 423A realizes various functions that make the third storage apparatus 10C, which is externally connected to the first storage apparatus 10A and the second storage apparatus 10B, function as a lock disk. The third storage apparatus 10C includes a quorum volume QVOL3 (200D). The quorum volume QVOL3 stores control information indicating whether lock information exists in the primary volume 200A of the first storage apparatus 10A or the secondary volume 200B of the second storage apparatus 10B. The details of the lock disk setting unit 423A will be described later.

The remote copy setting unit 423B, for example, sets various settings for synchronous remote copying from the primary volume 200A to the secondary volume 200B, sets a pair relationship between the volumes, and controls the pair status.

Figure 3:
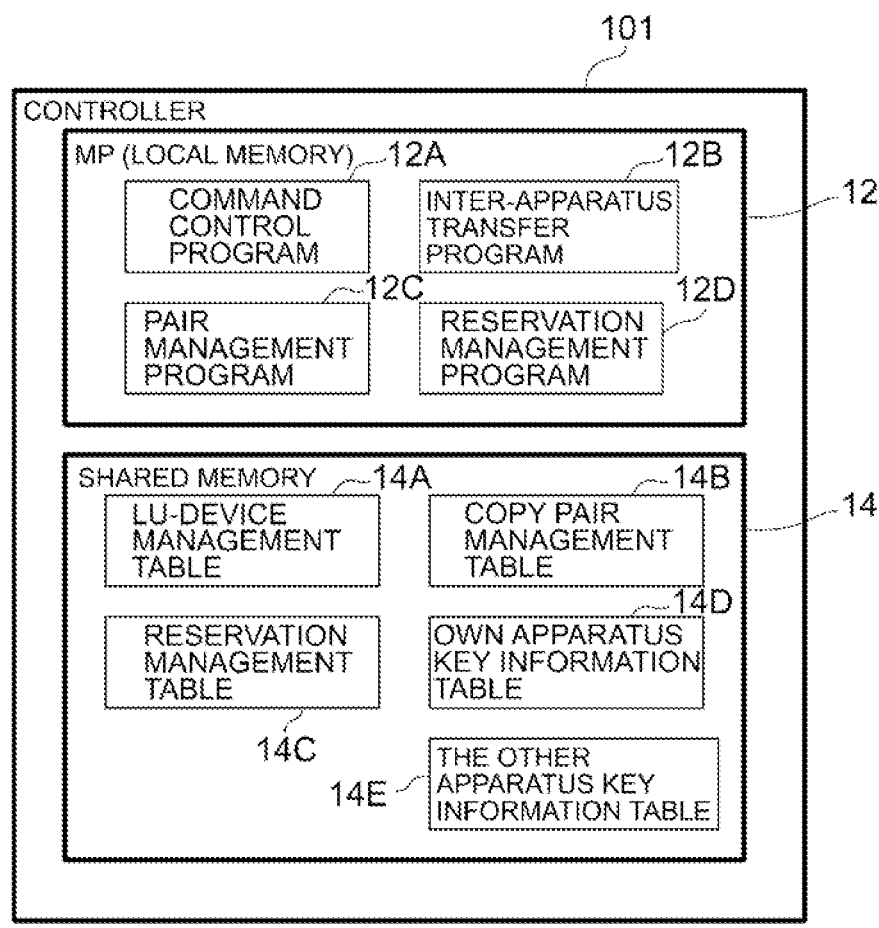
FIG. 3 is a block diagram showing a logical structure of a microprocessor and a shared memory for a first storage apparatus and a second storage apparatus.

FIG. 3 is a block diagram showing a logical structure of the microprocessor 12 and the shared memory 14 for the first storage apparatus 10A and the second storage apparatus 10B. The local memory for the microprocessor stores: a command control program 12A for processing read, write, or reservation commands from the host system 3 by referring to an LU-device management table 14A; an inter-apparatus transfer program 12B for referring to a copy pair management table 14B, identifying a destination storage apparatus to transfer data from the host system, and transferring data, reservation information, and persistent reservation key information; a pair management program 12C for referring to the copy pair management table 14B, managing the pair status of a plurality of volumes, and requesting the inter-apparatus transfer program to transfer data; and a reservation management program 12D for referring to and setting a reservation management table 14C and key information tables 14D, 14E and controlling a reservation status.

The shared memory 14 stores: the LU-device management table 14A for managing a correspondence relationship between logical volumes and storage devices where the logical volumes exist; the reservation management table 14C for managing the reservation information from the host system 3; the table 14B for managing volume pairs; the table D for managing key information for persistent reservation which is set to an own storage apparatus; and the table 14E for managing the key information for persistent reservation which is set to the other storage apparatus having a volume pair relationship with the own storage apparatus.

Figure 4:
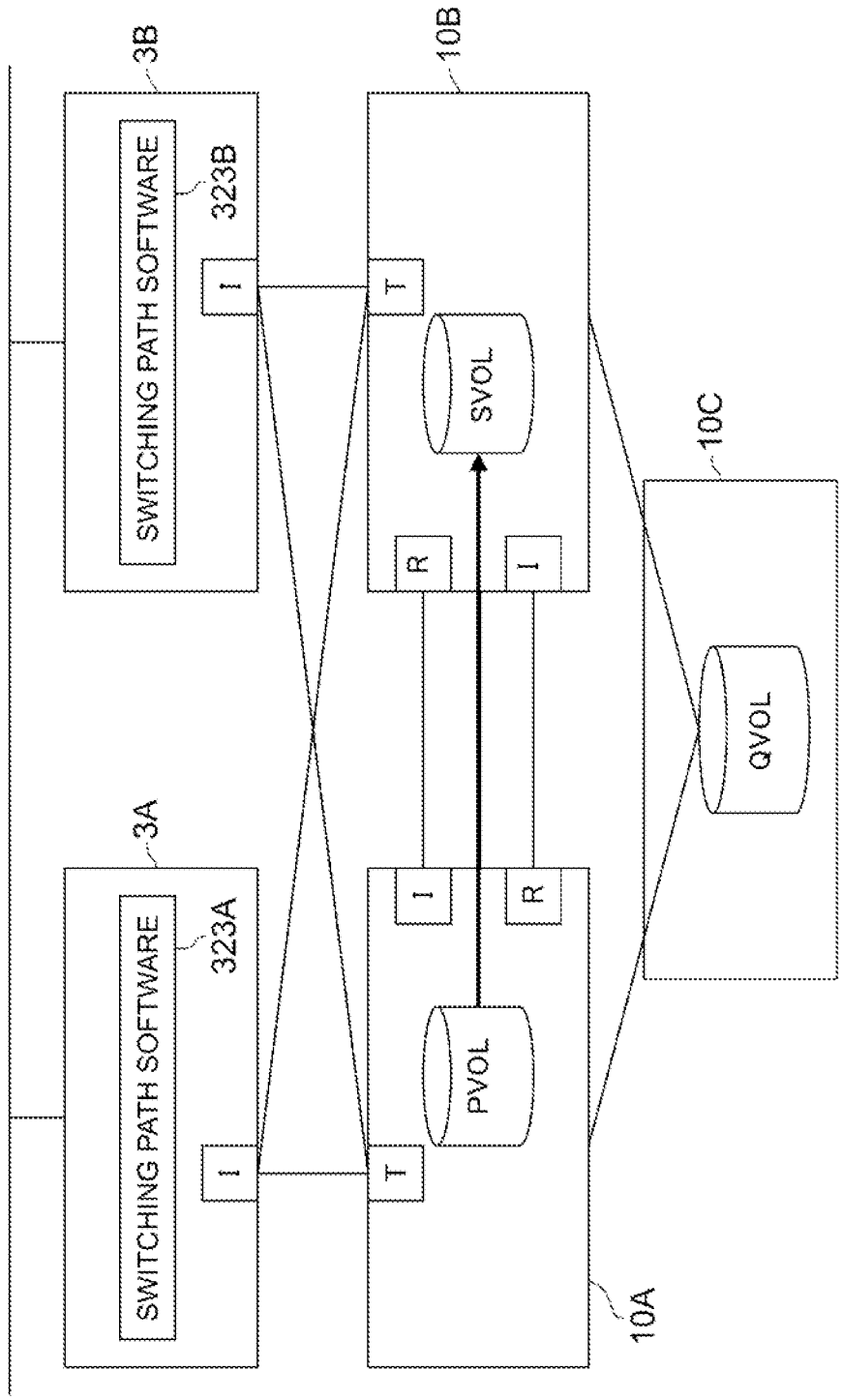
FIG. 4 is a block diagram showing the configuration of paths between host systems and storage apparatuses in the computer system.

FIG. 4 is a simplified block diagram showing a path structure between host systems and the storage apparatuses in the computer system. Dual host systems are provided in this computer system and there are a host system 3A and a host system 3B. The host system 3A is a host system at an online system site, while the host system 3B is a host system at a standby system site.

Each initiator port (I) of the host system 3A and the host system 3B has paths to target ports (T) of the storage apparatus 10A of the online system and the storage apparatus 10B of the standby system. Switching path software 323A, 323B of each host system controls switching of the paths from the host system to the plurality of storage apparatuses. With the computer system according to the present invention, each switching path program selects a path to access the first storage apparatus 10A in normal operation of the computer system. If an error such as timeout occurs when the host system accesses the first storage apparatus 10A, the switching path program switches a path for I/O issuance to the second storage apparatus 10B.

The first storage apparatus 10A and the second storage apparatus 10B connect their own initiator ports (I) and target ports (RCU target ports) respectively, thereby setting a pair relationship between a primary volume (PVOL) and a secondary volume (SVOL).

In a steady state where the primary volume and the secondary volume have a pair relationship, the computer system provides dual data in the primary volume and the secondary volume. When the first storage apparatus 10A writes data to the primary volume (PVOL) on the basis of write access from the host system 3A, 3B under the above-described circumstance, it does not have to check a right to access the quorum volume (QVOL), that is, lock information. This is because the primary volume (PVOL) apparently has ownership of the write access from the host system; and the lock information is not checked in order to reduce access overhead by the host system 3A, 3B to the quorum volume (QVOL) of the third storage apparatus 10C.

If dual data can no longer be maintained between the primary volume (PVOL) and the secondary volume (SVOL) and the sole operation by one volume is performed, the first storage apparatus 10A or the second storage apparatus refers to the quorum volume (QVOL) in order to check if its own apparatus or the other apparatus has the ownership of the write access from the host system. The details of the quorum volume (QVOL) will be explained below.

The QVOL is provided in order to deal with a state where communication between the first storage apparatus 10A and the second storage apparatus 10B is lost; and the QVOL retains information indicating where the ownership of processing on the write access from the host system belongs, whether the PVOL or the SVOL. In a steady state where the PVOL and SVOL are in a normal condition and the communication status between the first storage apparatus 10A and the second storage apparatus 10B is normal, ownership information is not stored in the QVOL. The storage apparatus stores the ownership information in the QVOL in a state where either the PVOL or the SVOL is in sole operation. Basically, the ownership is obtained or secured by the storage apparatus that determines to switch to the sole operation. During the PVOL sole operation, write data is reflected in the PVOL after the first storage apparatus 10A stores the lock information in the QVOL. When this happens, the second storage apparatus 10B cannot secure the lock information in the QVOL or reflect the write data in the SVOL. The second storage apparatus returns an error to the write access from the host system.

The third storage apparatus 10C having the QVOL is configured as a separate apparatus from the first storage apparatus 10A and the second storage apparatus 10B. It is necessary to place importance on, for example, power supply to the third storage apparatus 10C so that the third storage apparatus 10C can continue to operate even when either the first storage apparatus 10A or the second storage apparatus 10B is down. One quorum volume is required for a pair of storage apparatuses 10A, 10B which constitute a volume pair of the PVOL and the SVOL. The quorum volume is mapped to the PVOL and the SVOL as an external volume of the first and second storage apparatuses. A host path must not be defined for the quorum volume.

FIG. 5 is an example of an ownership management table. Apparatus 1 S/N is a serial number of the first storage apparatus 10A and Apparatus 2 S/N is a serial number of the second storage apparatus 10B. A lock information bitmap manages logical volumes, which have obtained a lock for the first storage apparatus, and logical volumes, which have obtained a lock for the second storage apparatus, in a bitmap form. Each bit of the bitmap corresponds to one logical volume. A QVOL ID is an identification number of a lock volume. This management table is stored in a specified storage area of each of the first storage apparatus 10A and the second storage apparatus 10B. In a case of the SVOL sole operation sate where the pair of PVOL and QVOL is in a suspended (stop) state, when the first storage apparatus 10A suspends the pair, the second storage apparatus 10 stores the ownership information of the SVOL in the QVOL at the time of reception of a write request from the host system, thereby resulting in a state where it has obtained the lock for the SVOL. When the PVOL receives a read/write command from the host system, the first storage apparatus 10A searches the QVOL to check a VOL having the ownership. Since the ownership of the SVOL is stored in the QVOL, the first storage apparatus 10A replies an error (check condition) to the host system. When the SVOL receives a read/write command from the host system, the second storage apparatus 10B searches the QVOL to check the ownership information of the SVOL, the ownership is set to the SVOL and, therefore, the second storage apparatus 10B then executes the read/write request from the host. The aforementioned HAM system implements synchronous copying between the primary volume and the secondary volume and control of the ownership of access from the host system to each volume at the time of the sole operation by one volume by using the quorum volume.

Next, the reservation management table 14C will be explained with reference to FIG. 6. The reservation is a mechanism for exclusive control of access from a plurality of host systems to volumes as described earlier; and in response to access from a host system other than a host system which has secured the reservation for a volume, the storage apparatus having that volume sends an error (reservation conflict). The reservation management table is constituted, on the basis of the primary volume or the secondary volume, from a volume ID (600), an initiator port ID (604) of the host system, a target port ID (602) of the storage apparatus, and a reservation valid flag 606. A WWN (World Wide Name) is used as the initiator port ID. When the storage apparatus receives a command relating to the reservation, it refers to the reservation management table; and if the reservation valid flag for the relevant volume is valid (Valid), the storage apparatus judges whether information of the target port and the initiator port, which is included in the command, is identical to information of the target port and the initiator port in the management table. If they are identical to each other, the storage apparatus can determine that the relevant command is a command from the host system which has secured the reservation, so that the storage apparatus receives that command. If the information of the target port and the initiator port, which is included in the command, is not identical to the information of the target port and the initiator port in the management table, the storage apparatus replies an error (reservation conflict) to the host system which has issued the command.

Since the reservation can be set to one logical volume by a combination of the target port and the initiator port, the first storage apparatus 10A and the second storage apparatus 10B can contain their reservation information in the same table without distinguishing the reservation information of one storage apparatus from that of the other apparatus by mutually sending the reservation information between the own apparatus and the other apparatus. When checking the reservation of a command which is received by its own apparatus and directed from the host system to the other apparatus, the reservation management program 12D can always reply the reservation conflict to the host system by storing a port number which does not exist in its own apparatus when the reservation management program 12D stores the reservation information, which is received by the other apparatus and transferred from the other apparatus, in the management table for its own apparatus.

Next, persistent reservation will be explained as another form of reservation. The aforementioned reservation is set by a combination of the target port and the initiator port for a path to a logical volume; and even if access from the host system is access to the same logical volume, the computer system enters a reservation conflict state if a combination of the ports for the path where the access passes is different. On the other hand, the persistent reservation is a processing system that permits host access to a logical volume via a plurality of paths if a reservation information key for a command from the host system matches key information in the reservation management table.

FIG. 7 is an example of the persistent reservation management table 14C. Persistent reservation management information is set on a logical volume basis. The reservation management information is constituted from a logical volume ID (700), information 702 of a registered key which is set to the relevant logical volume, and attributes of the relevant logical volume (distinction between PVOL and SVOL). Like the reservation management information shown in FIG. 6, the same persistent reservation information management table is stored in each of the first storage apparatus 10A and the second storage apparatus 10B. The first storage apparatus 10A and the second storage apparatus 10B transfer the registered key information about the volumes to each other. When the host system requests the reservation from the storage apparatus after the key information is registered from the host system to the storage apparatus, the reservation is set from the key information of the key information table to the management table. When the host system requests that the storage apparatus should release the reservation, the relevant entry is released from the reservation management information.

FIG. 8A and FIG. 8B are examples of the key management information tables. This key management information is constituted from information for the own apparatus 14D (FIG. 8A) and information for the other apparatus 14E (FIG. 8B) with respect to the first storage apparatus 10A and the second storage apparatus 10B, respectively. Both the key management information table 14D for the own apparatus and the key information table 14E for the other apparatus have information constituted from combinations of a logical volume ID (800), a target port ID (802), an initiator port ID (804), and registered key information (806). Regarding one logical volume, the host system can register a key for the storage apparatus with respect to each of a plurality of combinations of target ports and initiator ports. The first storage apparatus 10A and the second storage apparatus 10B have the key management information for the own apparatus and the key management information for the other apparatus by mutually transferring their key management information.

The key information table may be designed so that the number of reservation keys that can be registered may be determined in consideration of the number of switching paths, which can be set to one logical volume, and the number of initiator ports which can be connected to one target port. Since there will be an enormous number of such combinations, not all areas may be secured in the key information table and the key information may be dynamically allocated to the table by using, for example, hash.

There are dual storage apparatuses as in the system for realizing the HAM; however, regarding the redundant configuration to make the host system realize the storage apparatuses as logically one storage apparatus, in response to a reservation-related command (for example, reservation securement or reservation release) issued by the host system to a volume of the first storage apparatus, the second storage apparatus, which is the other apparatus of the first storage apparatus (two of them constituting the dual storage apparatuses), also needs to respond appropriately, for example, by responding in the same manner as a response made by the first storage apparatus to the host system. For example, the second storage apparatus sets reservation to the SVOL for the host system, which reserved the PVOL, in the same manner on the basis of the reservation information of the PVOL. So, as shown in FIG. 6 and FIG. 7, each of the plurality of storage apparatuses constituting the HAM sends the reservation management information of its own apparatus to the other apparatus, so that each storage apparatus can have the reservation information of its own apparatus and the reservation information of the other apparatus.

Figure 9:
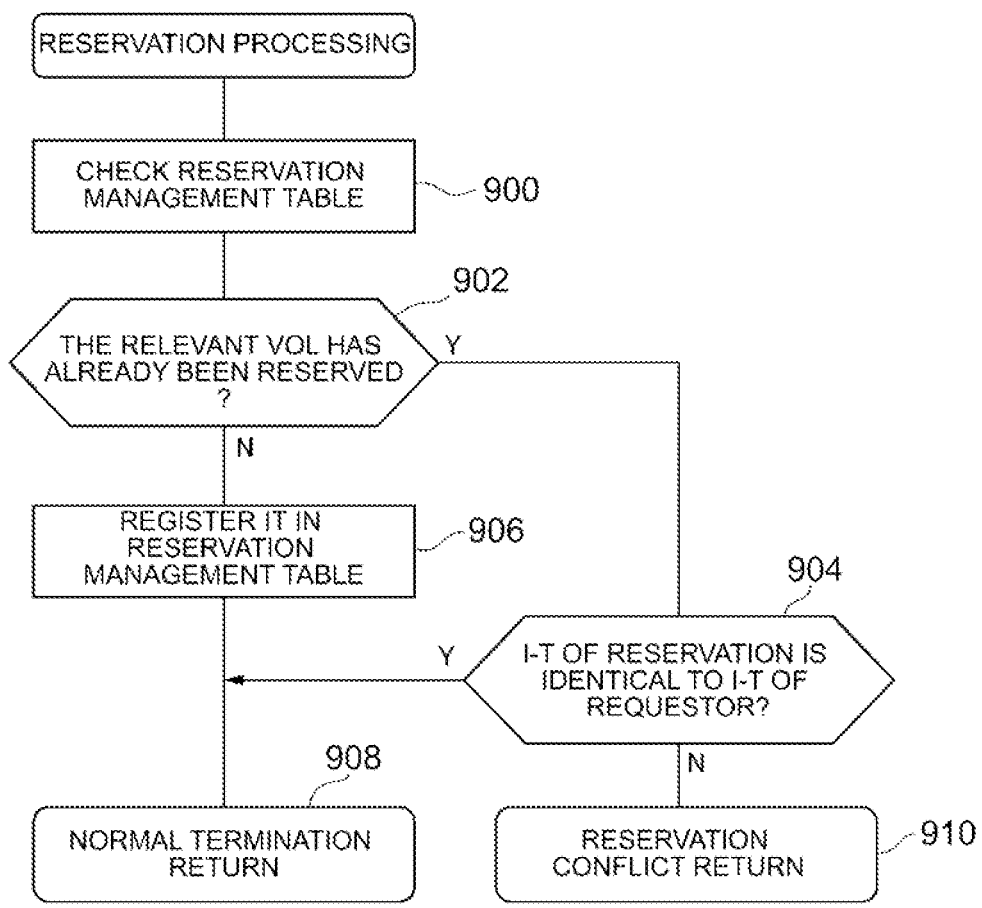
FIG. 9 is a flowchart illustrating reservation securement processing.

Next, the operation to manage the reservation of the storage apparatus will be explained. FIG. 9 is a flowchart explaining reservation securement processing by the reservation management program 12D. As explained earlier, the reservation is set by a combination of a path (a combination of an initiator port of the host system and a target port of the storage apparatus) and the logical volume ID. Incidentally, the combination of the initiator port and the target port will be hereinafter simply referred to as "I-T."

When the reservation management program 12D receives a reservation command (a command for reserving the primary volume or the secondary volume of the first storage apparatus 10A or the second storage apparatus 10B) from the host computer 3, it checks the reservation management table 14C (900) and judges whether the reservation target volume has already been reserved or not (902). If an affirmative judgment is returned, the reservation management program 12D judges whether I-T included in the reservation command is identical to I-T of the registered reservation management information or not (904). If they are the same I-T, the reservation management program 12D returns normal termination (908); and if they are not the same I-T, the reservation management program 12D returns the reservation conflict (910). On the other hand, if the volume has not been reserved, the reservation management program 12D registers the reservation information in the reservation management table 14C (906).

Figure 10:
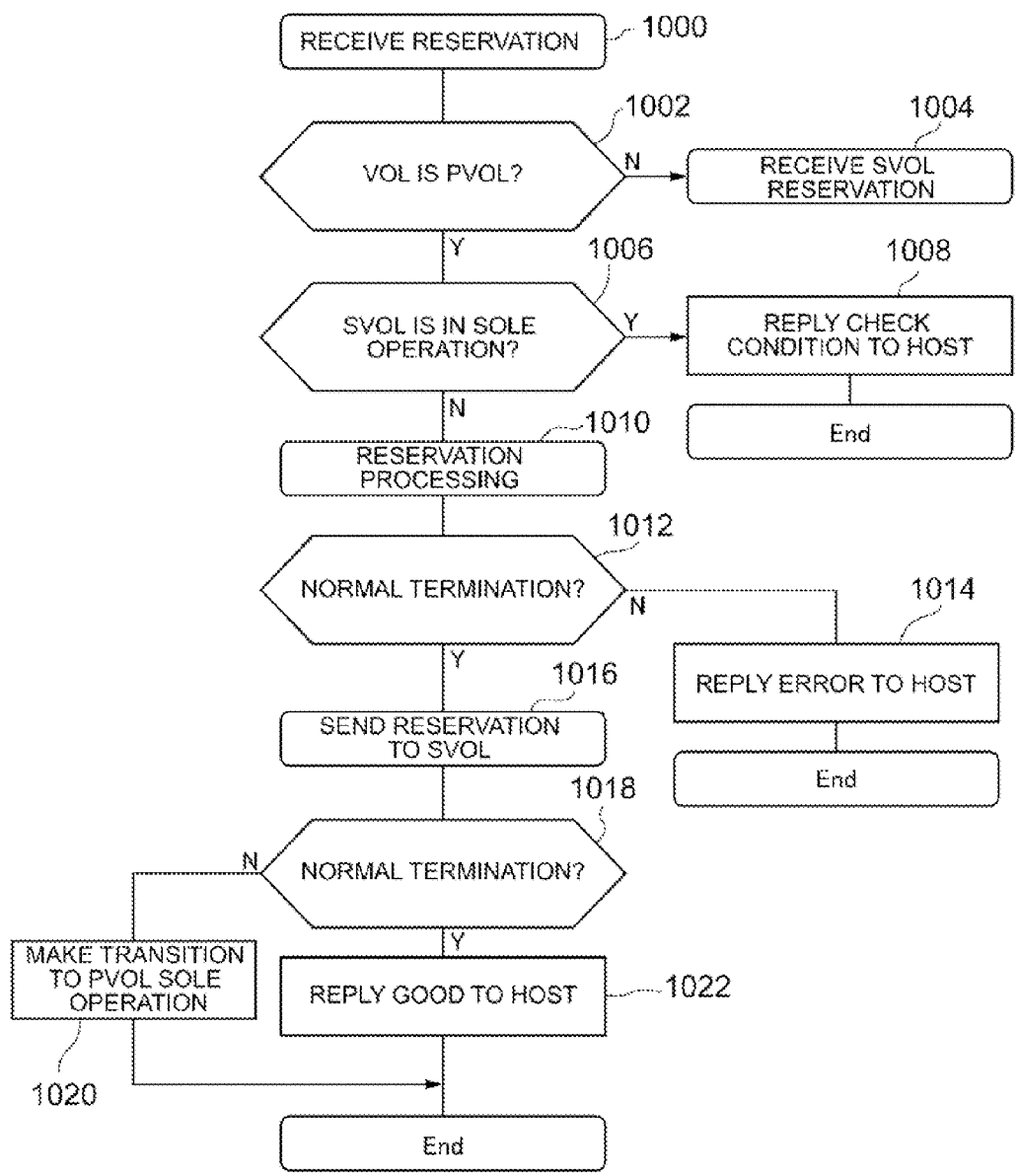
FIG. 10 is a flowchart illustrating processing executed when a primary volume receives a reservation command.

Next, FIG. 10 shows a flowchart of processing executed by the reservation management program 12D of the storage apparatus 10A when the primary volume (PVOL) receives a reservation command; and such processing will be explained below. Firstly, when the reservation management program 12D receives a reservation command (1000), it judges attributes of the reservation target volume (1002); and if the volume is the primary volume, the reservation management program 12D judges whether the secondary volume (SVOL) is in sole operation or not (1006). This judgment is made based on the lock information table (FIG. 5) or the pair status in the pair information table. If an affirmative judgment is returned, the reservation management program 12D replies an error (check condition) to the host system (1008). If a negative judgment is returned, the reservation management program 12D determines that the computer system is in a steady operation state; and then executes the aforementioned reservation securement processing (FIG. 9) (1010).

Next, the reservation management program 12D judges whether the reservation processing has normally terminated or not (1012). If a negative judgment is returned, the reservation management program 12D replies an error to the host system (1014). If an affirmative judgment is returned, the reservation management program 12D sends the reservation information to the second storage apparatus 10B having the secondary volume (SVOL) (1016). The reservation information is the control information constituting the aforementioned management table in FIG. 6.

In a case of the normal termination (1018), the reservation management program 12D returns a good response to the host system (1022); and if the reservation processing has not terminated normally, there is a possibility that communication between the first storage apparatus 10A and the second storage apparatus 10B has failed, so that the reservation management program 12D makes transition from the pair operation by the primary volume and the secondary volume to the sole operation by the primary volume because it is necessary to guarantee data consistency to the host system and the reservation securement processing cannot be executed at the secondary volume (1020). In the sole operation by the primary volume, the first storage apparatus 10A secures the lock for the aforementioned QVOL and executes write processing on the primary volume on the basis of write access from the host system 3.

Figure 11:
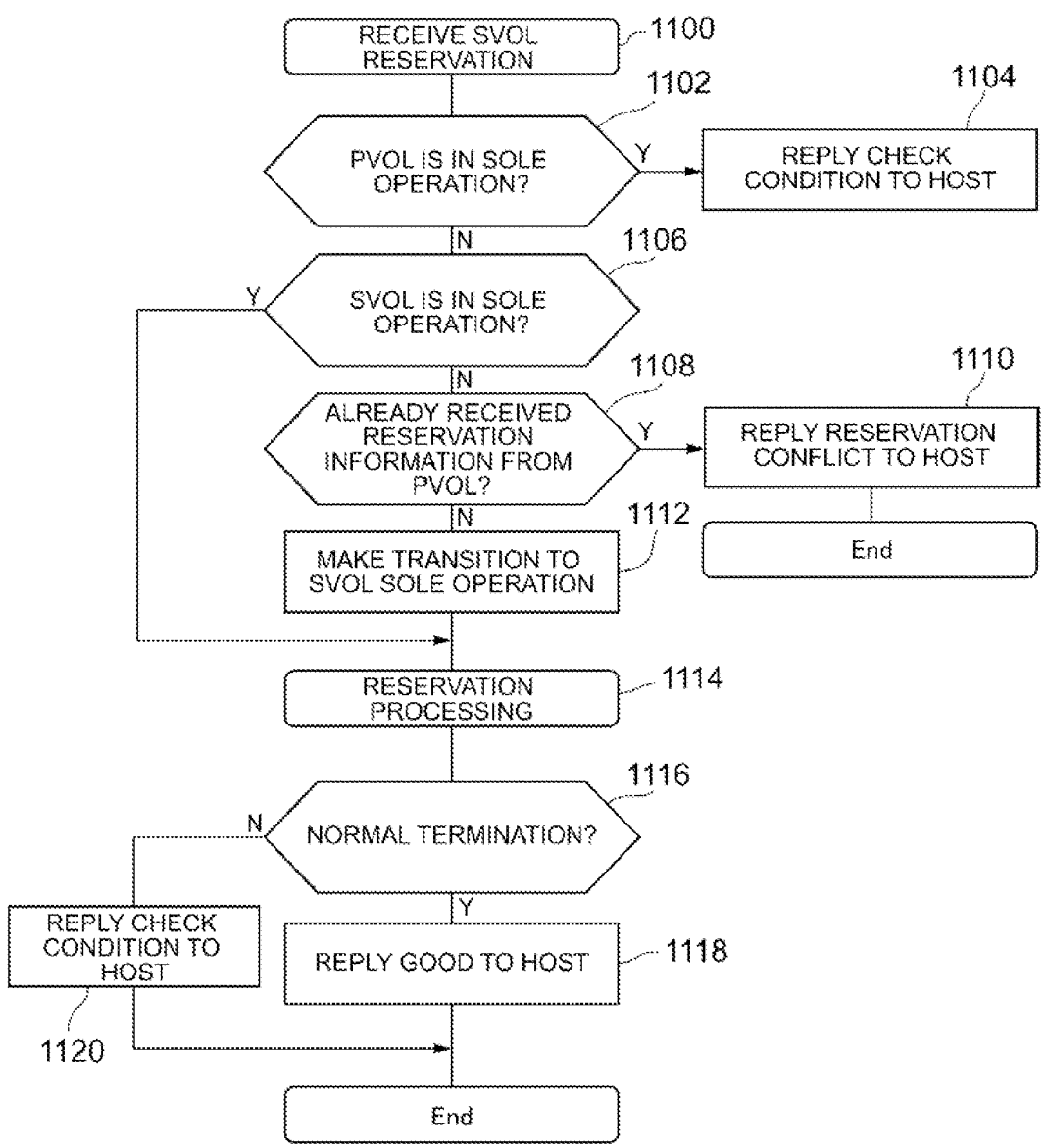
FIG. 11 is a flowchart illustrating processing executed when a secondary volume receives a reservation command.

On the other hand, FIG. 11 shows processing executed by the reservation management program 12D of the second storage apparatus 10B when a reservation command is issued to the secondary volume. Firstly, the reservation management program 12D judges whether the primary volume is in sole operation or not, based on the lock information of its own apparatus or the pair information (1102). If an affirmative judgment is returned, the reservation management program 12D replies the check condition to the host system (1104). During the sole operation by the primary volume, data of the secondary volume is not accurate, so that the reservation management program 12D does not allow the host system to reserve the secondary volume.

If a negative judgment is returned in step 1102, the reservation management program 12D judges whether the secondary volume is in sole operation or not (1106). If a negative judgment is returned, the reservation management program 12D checks the reservation management table 14C of the second storage apparatus 10B and judges whether the reservation information is received from the primary volume side or not (1108). If an affirmative judgment is returned, it means that the primary volume and the secondary volume are in the steady operation state and the primary volume, which is a copy source of the secondary volume, is reserved, so that the reservation management program 12D replies the reservation conflict to the host system (1110). If a negative judgment is returned, the reservation management program 12D makes transition to the sole operation by the secondary volume (1112) and executes processing for securing the reservation with respect to the secondary volume (1114). Since subsequent operation steps (1116 to 1120) are the same as those in the aforementioned flowchart (FIG. 10), any detailed explanation about them has been omitted.

Figure 12:
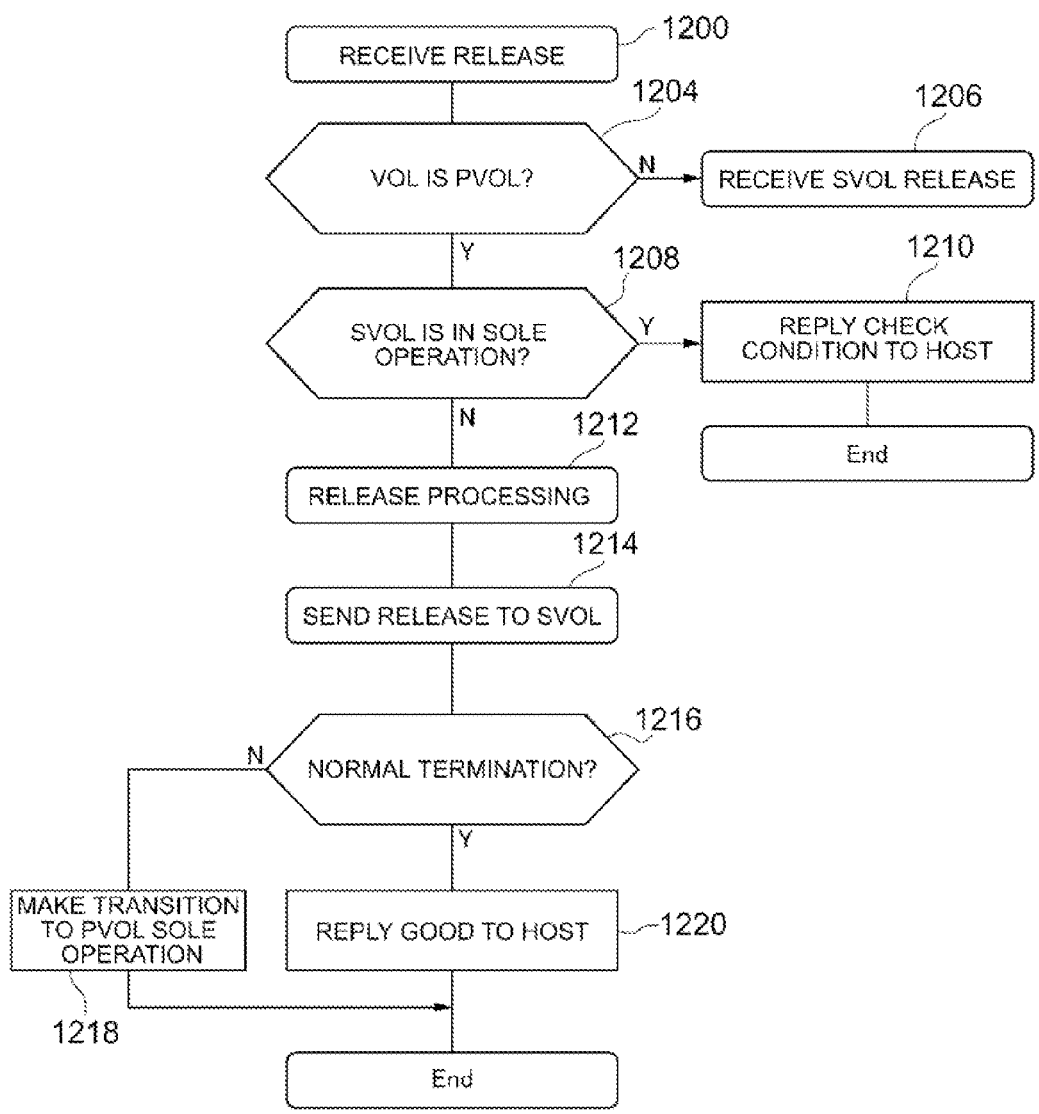
FIG. 12 is a flowchart illustrating reservation release processing (primary volume).

Next, FIG. 12 shows reservation release processing (on the primary volume side). When the reservation management program 12D of the first storage apparatus 10A receives a release request from the host system (1200), it judges whether the release target volume is the primary volume or not (1204). If the release target volume is the secondary volume, the release request for the secondary volume is executed (1206). In this case, the first storage apparatus 10A may transfer the release request to the second storage apparatus 10B or respond to the release request by returning an error to the host system or prompt the host system to send the release request to the second storage apparatus 10B. The release request for the secondary volume will be explained with reference to FIG. 13.

If an affirmative judgment is returned in this step (1204), the reservation management program 12D judges whether the secondary volume is in sole operation or not (1208). If an affirmative judgment is returned, this means that the primary volume is not in operation and, therefore, it is meaningless to release the reservation; and the reservation management program 12D replies the check condition to the host computer (1210). Incidentally, if the reservation exists, release of such reservation will not be precluded.

If the reservation management program 12D judges that the secondary volume is not in sole operation, it executes the reservation release processing on the primary volume (1212) and sends release information to the secondary volume (1214). If the transmission has not terminated normally (1216), it means that the reservation of the primary volume is released, but the reservation of the secondary volume cannot be released. Therefore, the communication between the first storage apparatus 10A and the second storage apparatus 10B fails and the synchronous pair operation by the primary volume and the secondary volume cannot be performed. So, the reservation management program 12D makes transition to the sole operation by the primary volume (1218). If it is determined that the transmission has terminated normally, it returns a good response to the host system (1220).

Figure 13:
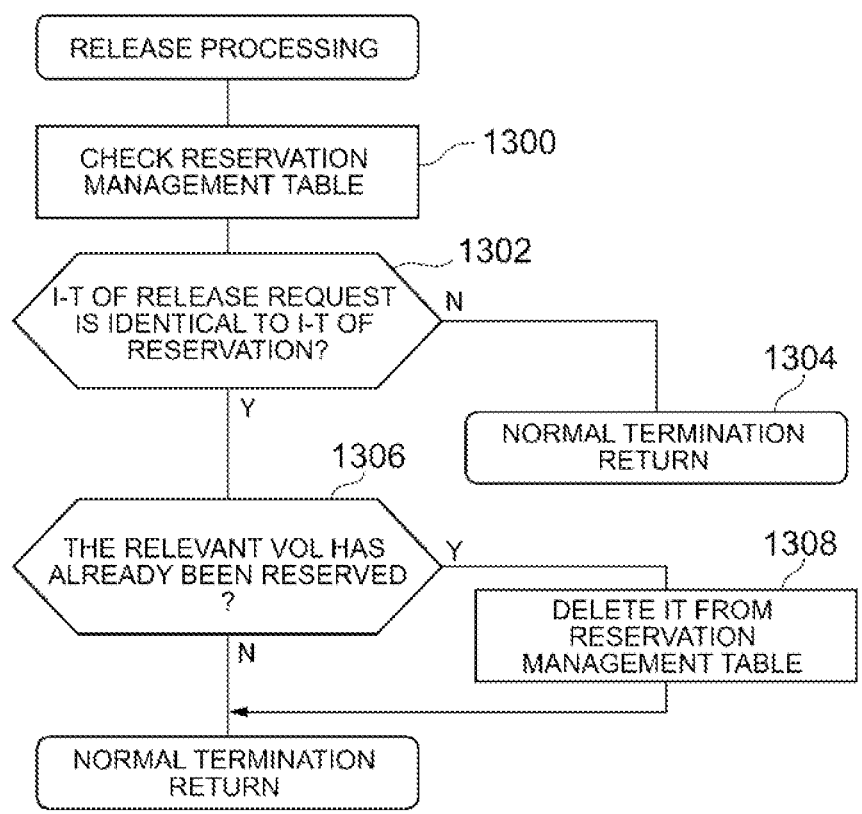
FIG. 13 is a flowchart illustrating the details of reservation release processing.

FIG. 13 is a flowchart showing the specific content of the reservation release processing (1212) in FIG. 12. The reservation management program 12D of the storage apparatus 10A, 10B checks the reservation management table 14C (1300) and checks if I-T of the release request is identical to I-T of the reservation command (1302). If a negative judgment is returned in this step, the reservation management program 12D recognizes that it is unnecessary to release the reservation; and returns the normal termination to the host computer (1304). On the other hand, if an affirmative judgment is returned in this step, the reservation management program 12D judges whether the release request target volume has already been reserved or not (1306). If an affirmative judgment is returned in this step, the reservation management program 12D deletes the reservation information from the reservation management table.

Figure 14:
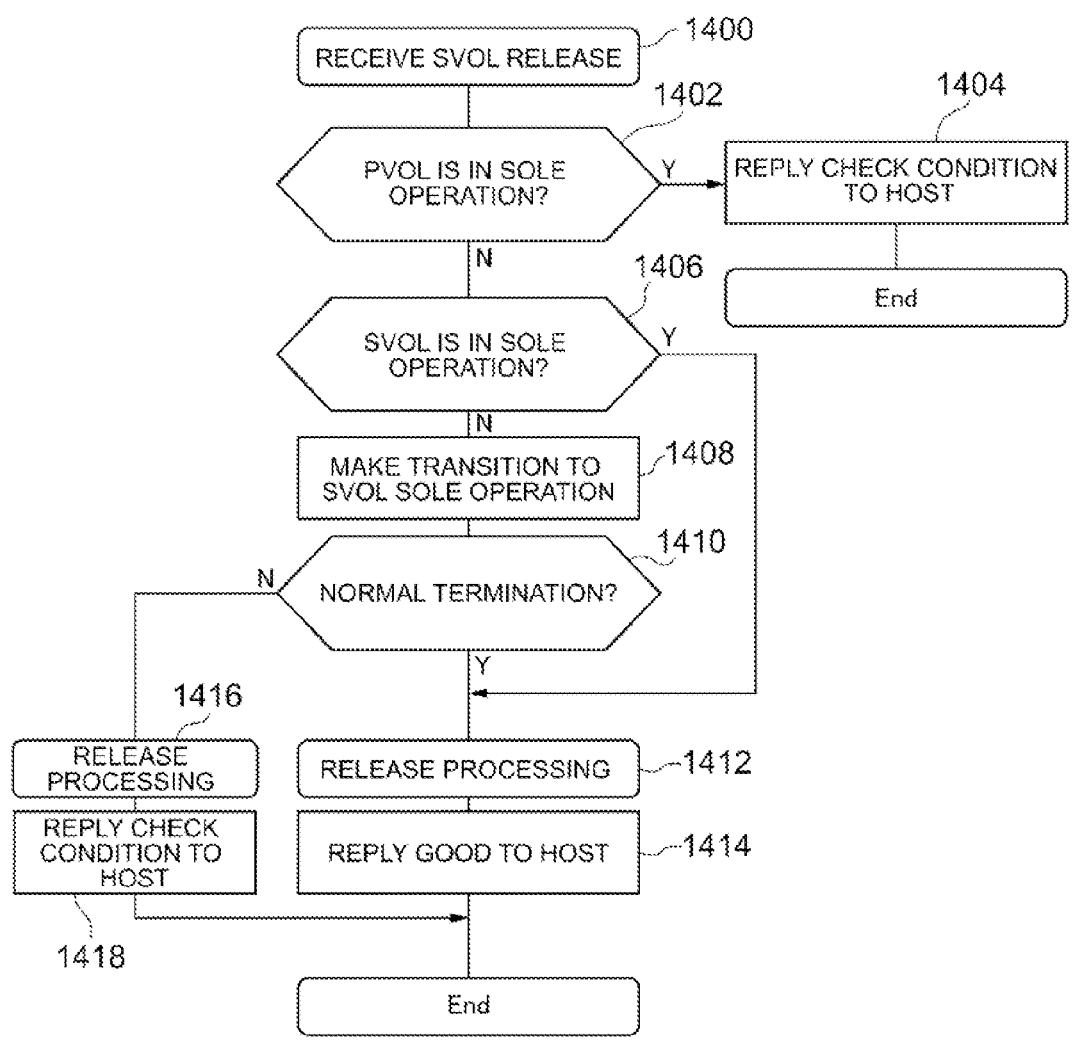
FIG. 14 is a flowchart illustrating reservation release processing on the secondary volume.

Next, FIG. 14 shows a flowchart illustrating reservation release processing on the secondary volume of the second storage apparatus 10B. Firstly, when the reservation management program 12D receives a release command directed to the secondary volume (1400), it judges whether the primary volume is in sole operation or not (1402).

If an affirmative judgment is returned in this step, the reservation management program 12D replies the check condition to the host computer (1404). If a negative judgment is returned in this step, the reservation management program 12D judges whether the secondary volume is in sole operation or not (1406), If a negative judgment is returned in this step, it is impossible that the SVOL is reserved by the host system in the steady state; so, if a release request for the secondary volume is received, the reservation management program 12D makes transition to the sole operation by the secondary volume (1408) in the same manner as a case of write processing on the secondary volume as described later. If the reservation management program 12D cannot terminate the transition to the sole operation by the secondary volume normally (1410), it releases the reservation of the secondary volume (1416) and then replies the check condition to the host system (1418). During the sole operation by the secondary volume or if the operation has been successfully switched to the sole operation by the secondary volume, the reservation management program 12D executes the release processing on the secondary volume (1412) and then returns the good response to the host computer (1414).

Figure 15:
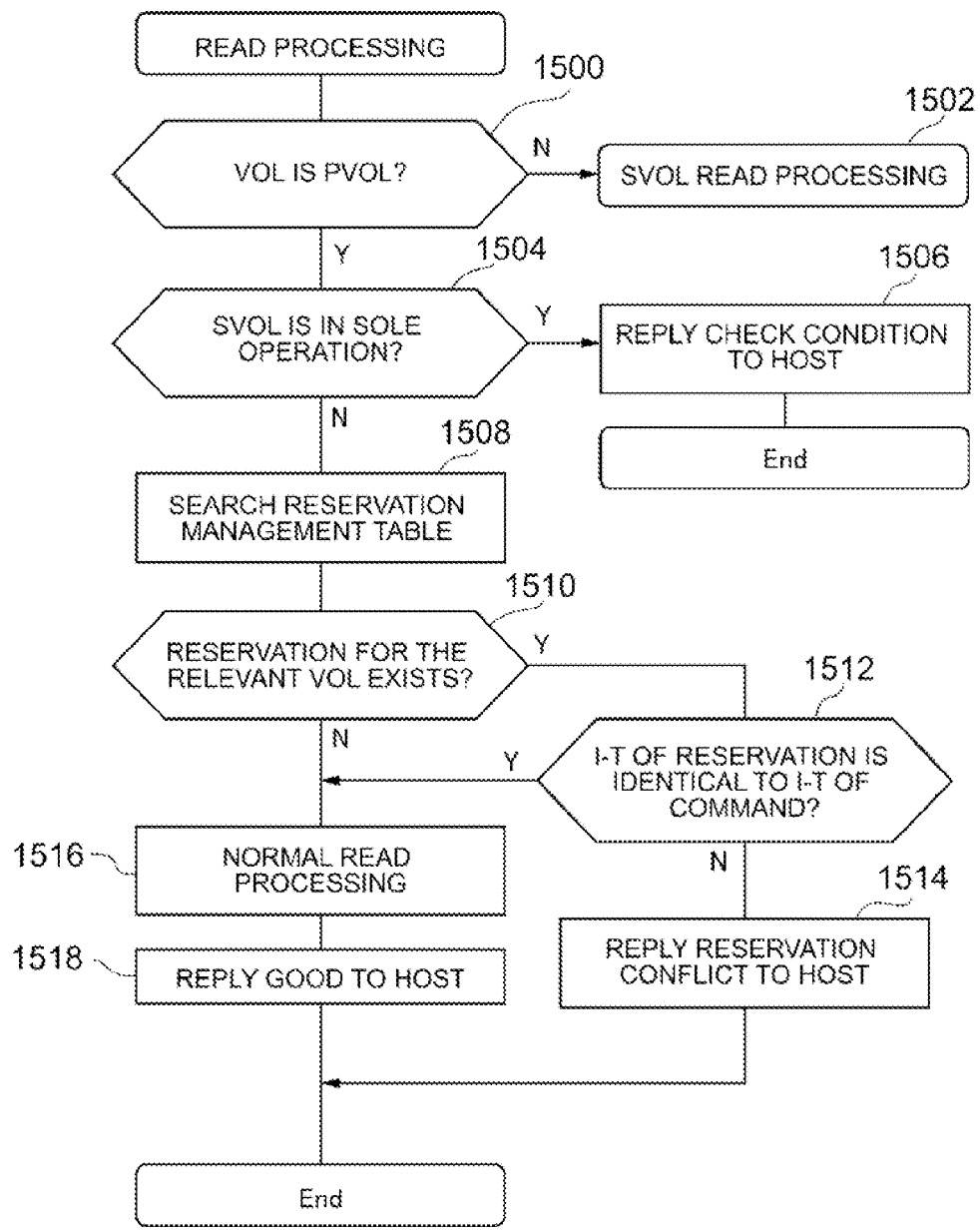
FIG. 15 is a flowchart illustrating read processing on the primary volume.

Next, processing by the computer system when read processing is executed by the host system on the primary volume will be explained with reference to a flowchart shown in FIG. 15. The pair management program 12C judges whether the read target volume is the primary volume or not (1500). If the read target volume is not the primary volume, read processing on the secondary volume as described later will be executed (1502).

If an affirmative judgment is returned in this step, the pair management program 12C judges whether the secondary volume is in sole operation or not (1504), If an affirmative judgment is returned, the pair management program 12C replies the check condition to the host computer (1506) because there is a possibility that accurate data may not be reflected in the primary volume. If a negative judgment is returned in this step, the reservation management program 12D searches the reservation management table 14C and judges whether the reservation of the read target volume exists or not (1510). If an affirmative judgment is returned, the reservation management program 12D judges whether the reserved I-T is identical to I-T of the read command or not (1512). If they are the same I-T and the reservation is not set to the read target volume, the command control program 12A executes read processing on the primary volume (1516) and returns the good response to the host system (1518). On the other hand, if the reservation information of the read request is different from the reservation information registered in the reservation management table (a negative judgment in step 1512), the command control program 12A returns an error (reservation conflict) to the host system (1514).

Figure 16:
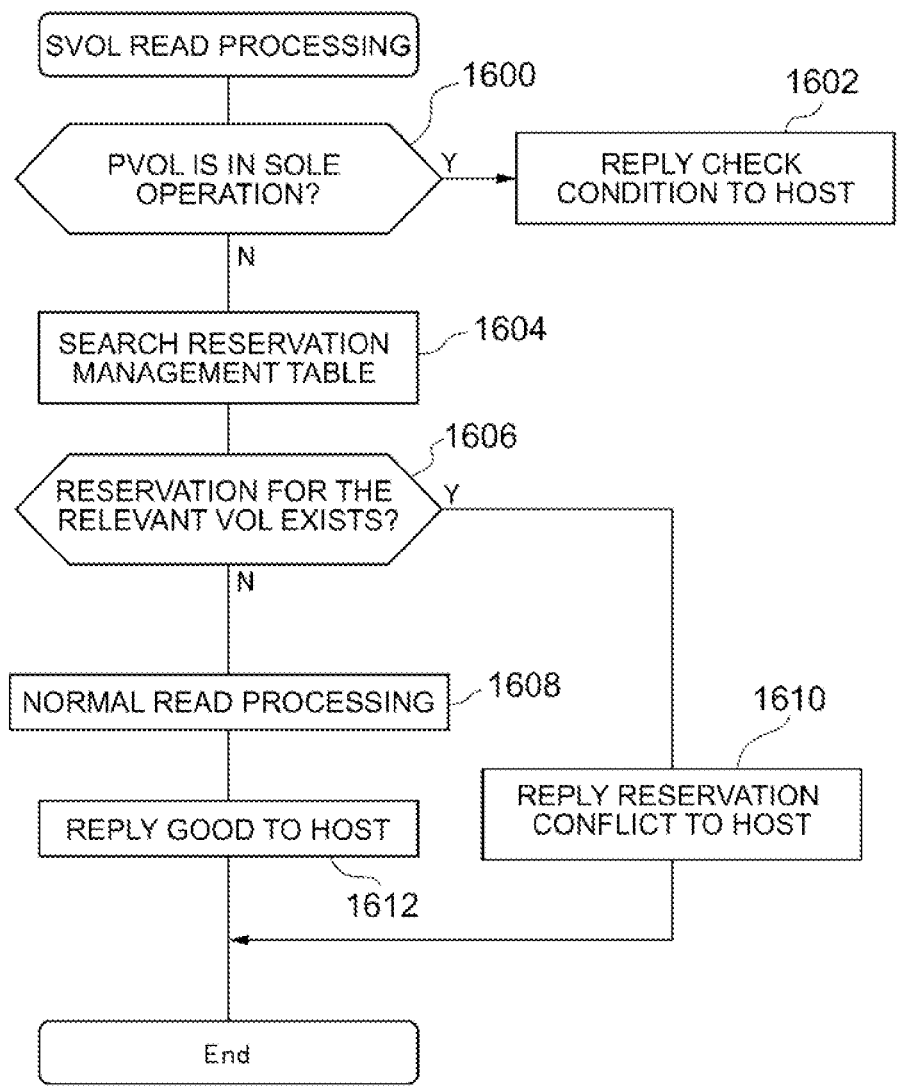
FIG. 16 is a flowchart illustrating read processing on the secondary volume.

Next, FIG. 16 shows a flowchart of read processing on the secondary volume, which will be explained below. The pair management control program 12C judges whether the primary volume is in sole operation or not (1600). If an affirmative judgment is returned in this step, it means that data of the secondary volume is not the latest data, so that the pair management control program 12C replies the check condition to the host system (1602).

If the primary volume is not in sole operation, that is, the primary volume and the secondary volume are operated in the pair state or the secondary volume is in sole operation, the reservation management program 12D searches the reservation management table 14C (1604); and if the reservation for the secondary volume exists (1606), the reservation management program 12D immediately replies an error to the host system (1610) because the reservation is not normally set to the secondary volume in the steady state where the primary volume and the secondary volume constitute a pair. If the reservation for the secondary volume does not exist, the command control program 12A executes normal read processing (1608) and then returns the good response to the host computer (1612). Incidentally, if the primary volume and the secondary volume are operated in the pair state, the system operation status will not be changed to the sole operation by the secondary volume during the read processing on the secondary volume unlike the case of write processing on the secondary volume (described later). This is because the OS for the host system may sometimes issue a read command to the second storage apparatus 10B as triggered by, for example, host reboot even if there is no failure of the HAM system; and the operation status should not be changed to the sole operation by the secondary volume every time the above-described situation takes place.

Figure 17:
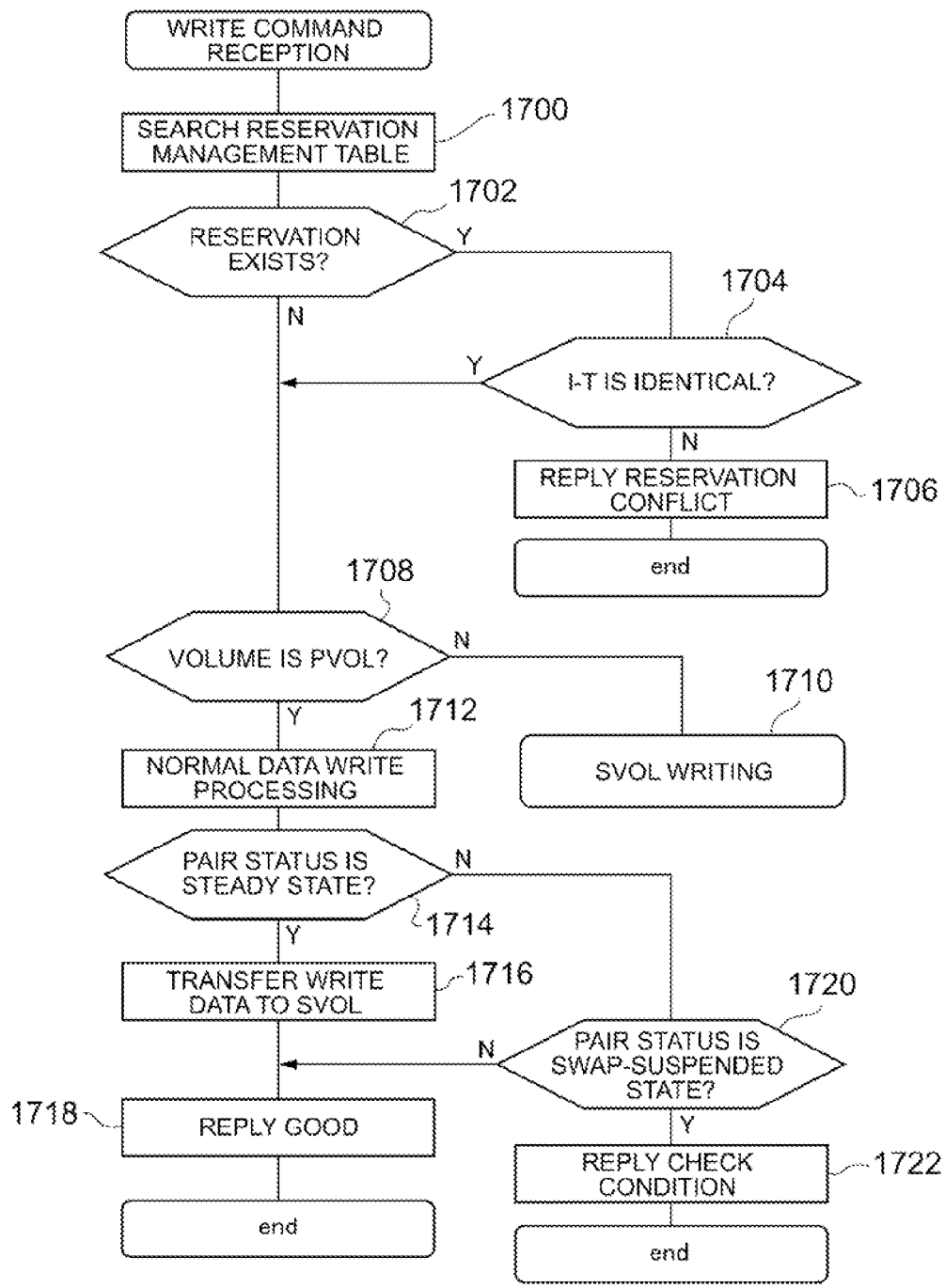
FIG. 17 is a flowchart illustrating write processing on the primary volume.

Next, FIG. 17 shows a flowchart of the operation to be performed when the storage apparatus 10A of the online system receives a write command from the host system 3, which will be explained below. When the command control program 12A of the online system storage apparatus receives a write command, it searches the reservation management table 14C (1700) and judges whether the reservation information is registered or not (1702). If the reservation is set to the write target volume, the reservation management program 12D judges whether I-T of the write command is identical to I-T of the reservation management information (1704). If they are different, the reservation management program 12D replies a write error (check condition) to the host system (1706). Incidentally, the check condition is an error message defined by SCSI.

If the reservation information does not exist and the reservation information of the write command is identical to the reservation management information, the pair management program 12C judges whether the write target volume is the primary volume or not (1708). If the write target volume is the secondary volume, the write processing on the secondary volume is executed (1710). If the write target volume is the primary volume, the write processing is executed (1712).

Subsequently, the pair management program 12C checks the pair status of the primary volume and the secondary volume (1714); and if the pair status is normal, the inter-apparatus transfer program 12B transfers write data to the secondary volume (1716) and the command control program 12A returns the good response to the host system (1718). On the other hand, if the pair status is a swap-suspended state, that is, the sole operation by the secondary volume (1720), the command control program 12A replies the check condition to the host system (1722) because the write data cannot be transferred to the secondary volume. When the pair status is other than the swap-suspended state, for example, the sole operation by the primary volume, it is unnecessary to transfer the write data to the secondary volume and the command control program 12A returns the good response to the host system (1718).

Figure 18:
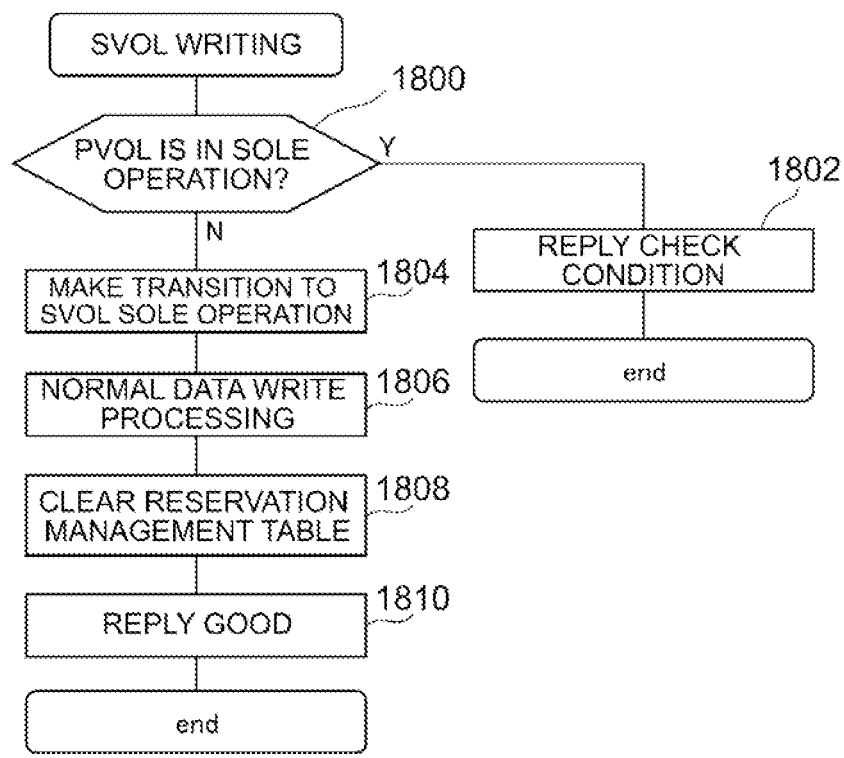
FIG. 18 is a flowchart illustrating write processing on the secondary volume.

Next, write processing on the secondary volume will be explained with reference to FIG. 18. Firstly, when the command control program 12A of the standby system storage apparatus 10B accepts the write processing on the secondary volume from the host system 3, the pair management program 12C judges whether the primary volume is in sole operation or not (1800), If an affirmative judgment is returned in this step, the command control program 12A returns an error response to the host system without executing the write processing on the secondary volume (1802). If the primary volume is not in sole operation, the pair management program 12C splits the pair of the primary volume and the secondary volume and makes transition to the sole operation by the secondary volume (1804) and the command control program 12A executes normal write processing on the secondary volume (1806). Then, the reservation management program 12D clears the reservation management table for the secondary volume (1808) and returns the good response to the host system (1810).

The system does not check if the reservation exists or not, when writing data to the secondary volume because writing data to the secondary volume occurs as a result of path switching by the switching path program of the host system and a change to the sole operation by the secondary volume due to a failure of the online system storage apparatus and the transition is made to the sole operation by the secondary volume. Therefore, no consideration is paid to the reservation for the secondary volume. As a result, if the reservation for the secondary volume exists in the reservation management table, the reservation management program 12D clears such reservation (1808).

Incidentally, if the secondary volume receives write data to the primary volume from the primary storage apparatus 10A, the command control program 12A of the secondary storage apparatus 10B executes the write processing on the secondary volume.

Figure 19:
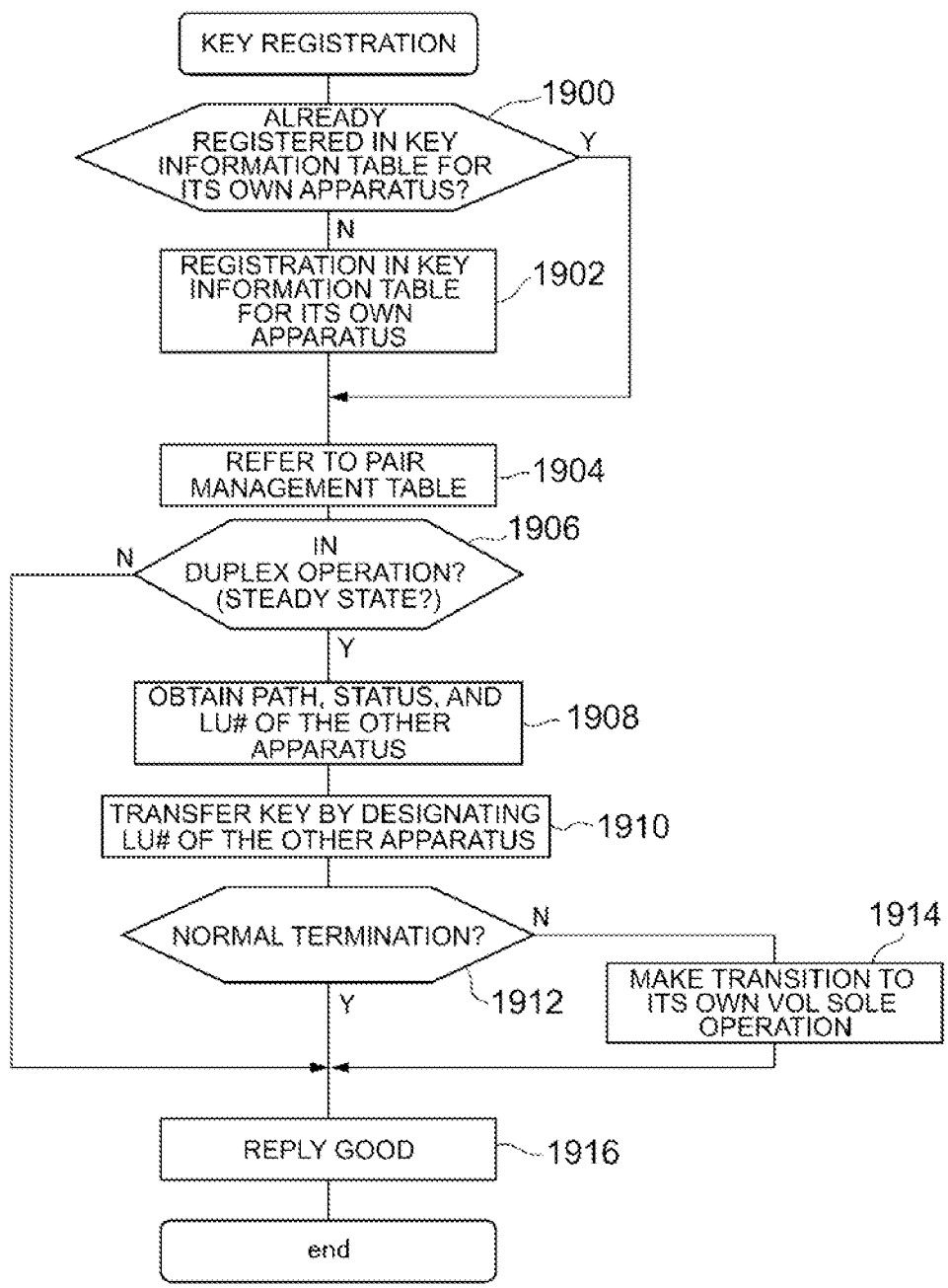
FIG. 19 is a flowchart illustrating persistent reservation key registration processing.

The reservation processing which does not involve key registration has been explained above. Next, a second embodiment about the operation of the HAM system will be explained together with an explanation of a series of processing involved in persistent reservation. Firstly, a flowchart illustrating key registration required for the persistent reservation will be explained with reference to FIG. 19. When the storage apparatus (the first storage apparatus 10A or the second storage apparatus 10B) having a copy pair relationship receives a key registration request from the host system 3, its reservation management program 12D checks whether a key is already registered in the key information table 14D for its own apparatus or not (1900). If a negative judgment is returned in this step, the reservation management program 12D registers the key information in the key information table for its own apparatus (1902). The reservation management program 12D captures the initiator port ID of the host system and the target port ID of the storage apparatus from the command for key registration and registers these pieces of information and the key information in the key information table 14D.

Figures 20, 21:
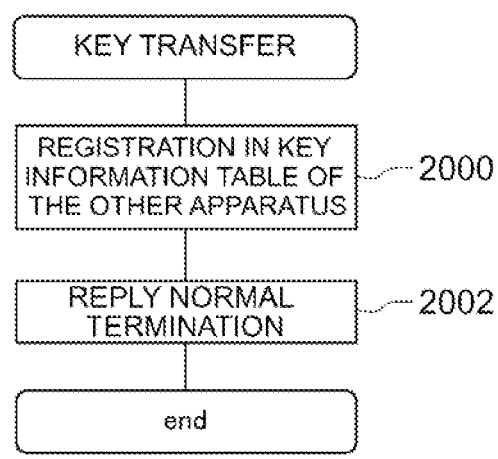
FIG. 20 is a flowchart illustrating processing executed at an own apparatus to which a key(s) has been transferred from the other apparatus with which the own apparatus has a volume copy pair relationship.
FIG. 21 is an example of a format of a key information transfer command from the own apparatus to the other apparatus.

Subsequently, the pair management program 12C refers to the pair management table 14B and judges whether the primary volume and the secondary volume are in the dual operation state (steady state) or not (1906). If they are in the steady state, the transfer control program 12B obtains a path for data transfer to the other apparatus, status, and LU# (1908) and transfers the key information by designating the other apparatus LU# (1910). If the key transfer has terminated normally, the reservation management program 12D returns the good response to the host system (1916). If the key transfer has not terminated normally, the key registration to the volume of the other apparatus cannot be performed even in the steady state, so that the operation status is switched to the sole operation by the volume of its own apparatus (1914). FIG. 20 is a flowchart showing processing executed by its own apparatus when the first storage apparatus 10A or the second storage apparatus 10B receives the key transfer from the other storage apparatus; and the reservation management program 12D registers the transferred key information in the key information table 14E for the other apparatus (2000) and returns a normal termination response to the other apparatus (2002).

A persistent reservation (PR) OUT command according to the SCSI standard does not include, as parameters, an ID (LU#) of a target logical volume (primary volume or secondary volume) of the persistent reservation, a target port ID of the storage apparatus, to which the persistent reservation request is made, and an initiator port ID of the host system which issues the persistent reservation. This is because these parameters are standards according to the Fibre Channel (FC) Protocol and are not SCSI-level information. Therefore, the management program for the storage apparatus incorporates these pieces of information into command parameters and sends them to the other apparatus. FIG. 21 is an example of a format of a key information transfer command. The standby system storage apparatus presents the identification information of the secondary volume as the same identification information as that of the primary volume to the host system. Therefore, the host system recognizes the volumes of the copy pair as one logical volume. However, the identification number of the primary volume is different from that of the secondary volume between the storage apparatuses. Furthermore, if the key(s) is delivered as is from the online system apparatus to the standby system apparatus, the initiator port and the target port (I-T) of the transfer path is different from those of the path from the host system. So, there is an issue of concern that the target of key registration may not be the combination of the switching path of the host system and the secondary volume, but the ports between the storage apparatuses may become the key registration targets and, for example, a control command (pair control command) may also become the reservation target. Therefore, the storage apparatus which has received the persistent reservation key registration command from the host system changes this command as shown in FIG. 21 and transfers the command between the storage apparatuses having the pair target volumes.

Figure 22:
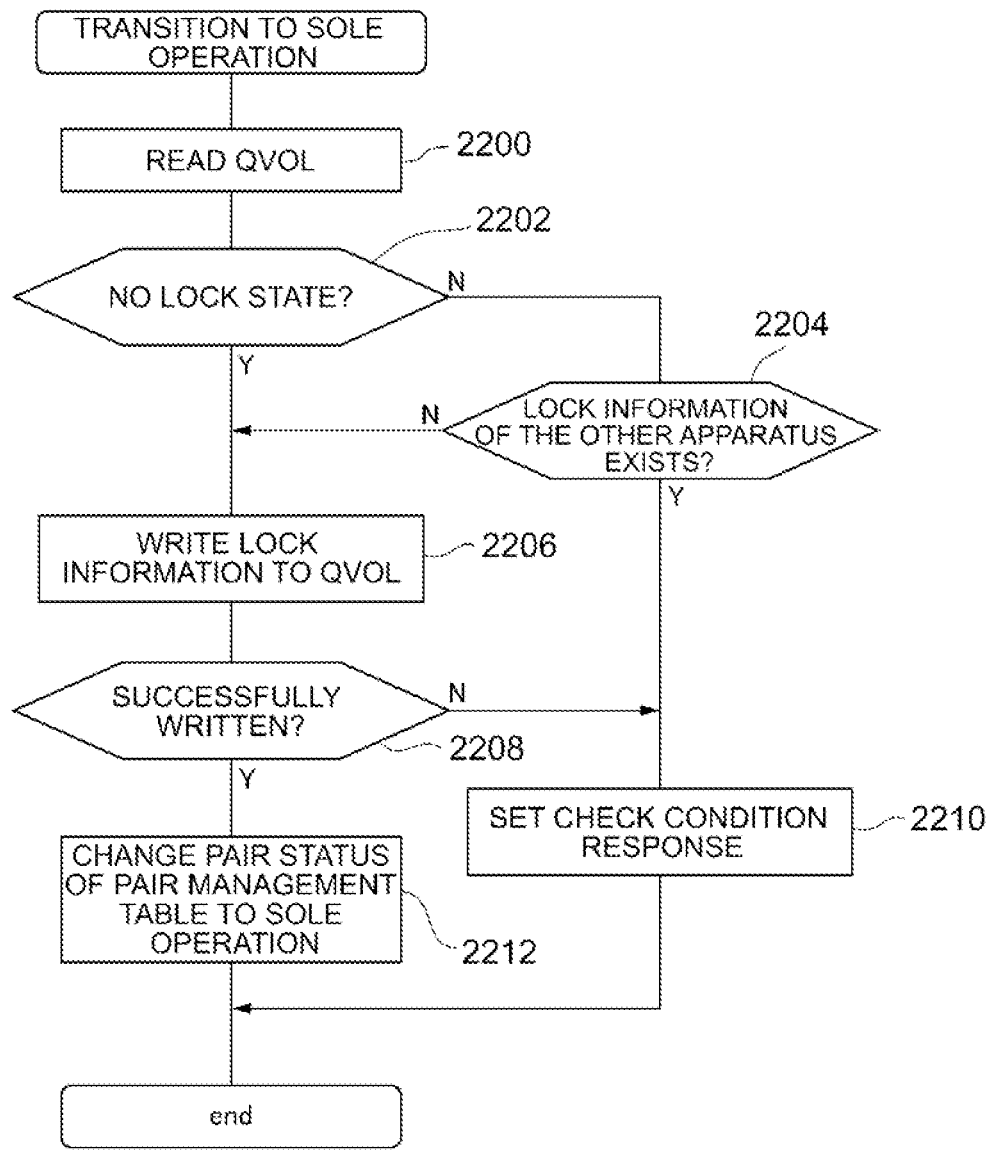
FIG. 22 is a flowchart illustrating processing for making transition from a pair operation state of the primary volume or the secondary volume to a sole operation state.

Next, FIG. 22 shows a flowchart illustrating processing executed by the pair management program 12C of the storage apparatus to make transition from the pair operation state of the primary volume or the secondary volume to the sole operation state, which will be explained below. The pair management program 12C reads the quorum volume (QVOL) of the lock disk 10C (2200) and judges whether the lock information exists or not (2202). If the lock information exists, the pair management program 12C judges whether such lock information is lock information for the volume of the other apparatus with which the relevant apparatus has a volume pair relationship (2204); and if it is the lock information for the other apparatus, the pair management program 12C replies the check condition to the host system or the management device which is a requestor for the operation change (2210).

If there is no lock or if the lock information is not the lock information for the other apparatus, the pair management program 12C writes the lock information to the quorum volume (2206). If the lock information has been written successfully (2208), the pair management program 12C changes the pair status in the pair management table to the sole operation (2212). The pair management table for the other apparatus will be changed in the same manner.

Figure 23:
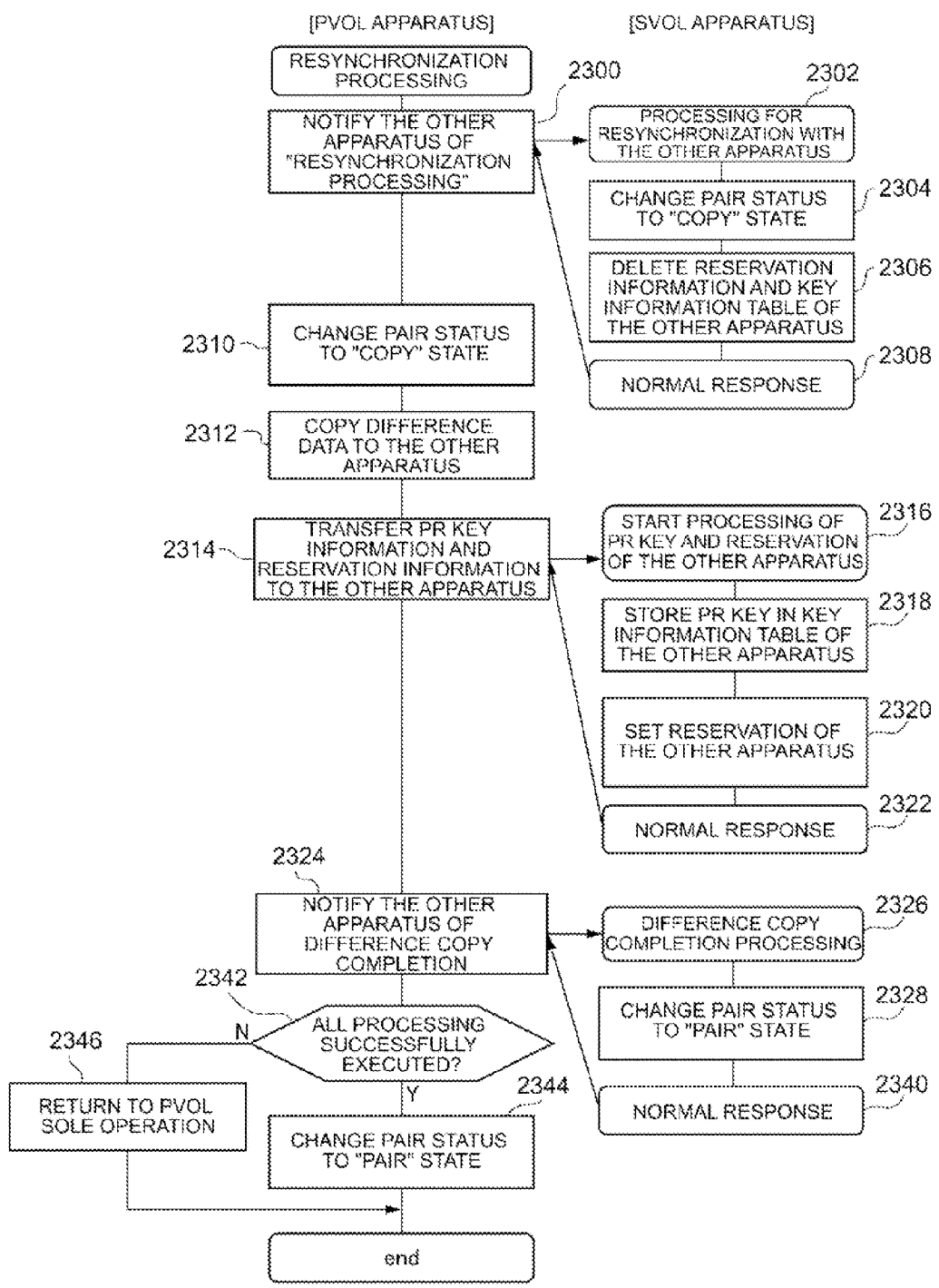
FIG. 23 is a flowchart illustrating resynchronization processing for switching from the sole operation by the primary volume to the pair operation by the primary volume and the secondary volume.

Next, FIG. 23 shows a flowchart illustrating resynchronization processing for switching the sole operation by the primary volume to the synchronous pair operation by the primary volume and the secondary volume, which will be explained below. The pair management program 12C of the online system storage apparatus 10A notifies the standby system storage apparatus (the other apparatus) 10B of the resynchronization processing (2300).

Having received this notice, the pair management program 12C of the second storage apparatus 10B starts the processing of resynchronization with the other apparatus (the first storage apparatus 10A) (2302) and changes the pair status in the pair management table to a copy state (2304). Subsequently, the reservation management program 12D of the secondary storage apparatus 10B deletes the reservation information and the key information of the other apparatus (the first storage apparatus 10A) from the management table (2306) and replies a normal response to the first storage apparatus (2308). Incidentally, the reservation information and the key information of its own apparatus may be deleted.

The pair management program 12C of the first storage apparatus 10A which has received this normal response changes the pair status in the pair management table 14B to the copy state (2310). Subsequently, the pair management program 12C transfers difference data from the start time of the sole operation to the second storage apparatus 10B (2312). Then, the transfer control program 12B transfers the persistent reservation (PR) key information and the reservation information to the second storage apparatus 10B (2314). Having received this transfer, the second storage apparatus 10B starts processing of the key information of the other apparatus (the first storage apparatus 10A) (2316) and registers the key information in the key information table 14E (2318). Subsequently, the reservation management program 12D sets the reservation of the first storage apparatus 10A to the reservation management table 14C (2320) and returns the normal response to the first storage apparatus (2322).

When the first storage apparatus 10A receives the normal response, it notifies the other apparatus (the second storage apparatus 10B) of difference copy completion (2324). The pair management program 12C of the second storage apparatus 10B which has received this notice starts difference copy completion processing (2326), changes the pair status to the pair state (2328), and then returns the normal response to the first storage apparatus 10A (2340).

If all the above processing have been executed successfully (2342), the pair management program 12C of the first storage apparatus 10A changes the pair status to the "pair state" (2344); and if a negative judgment is returned in this step, the pair management program 12C changes the pair management table back to the previous state to bring the primary volume back to the sole operation.

Now, the reason why the reservation and the key information are deleted from the storage apparatus having the secondary volume during the resynchronization processing will be explained. The sole operation in the HAM system is a state as recognized by the host system where the path which is not owned, that is, the path to the storage apparatus having the volume which is not being operated, is deactivated. Once that path has recovered, the host system attempts access to the path which has recovered, in order to register the persistent reservation key and secure the reservation. Then, as the sole operation by the primary volume is recovered to the pair operation state by the primary volume and the secondary volume in order to reconstruct the reservation setting to the secondary volume, the key information and reservation information of the primary storage apparatus 10A on the secondary storage apparatus 10B side are deleted once and these pieces of information are newly transferred from the primary storage apparatus to the secondary storage apparatus. As a result, even if the host system refers to the secondary storage apparatus 10B for the key information and the reservation information, the secondary storage apparatus can return the information, which is different between the primary volume and the secondary volume, to the host system.

Figure 24:
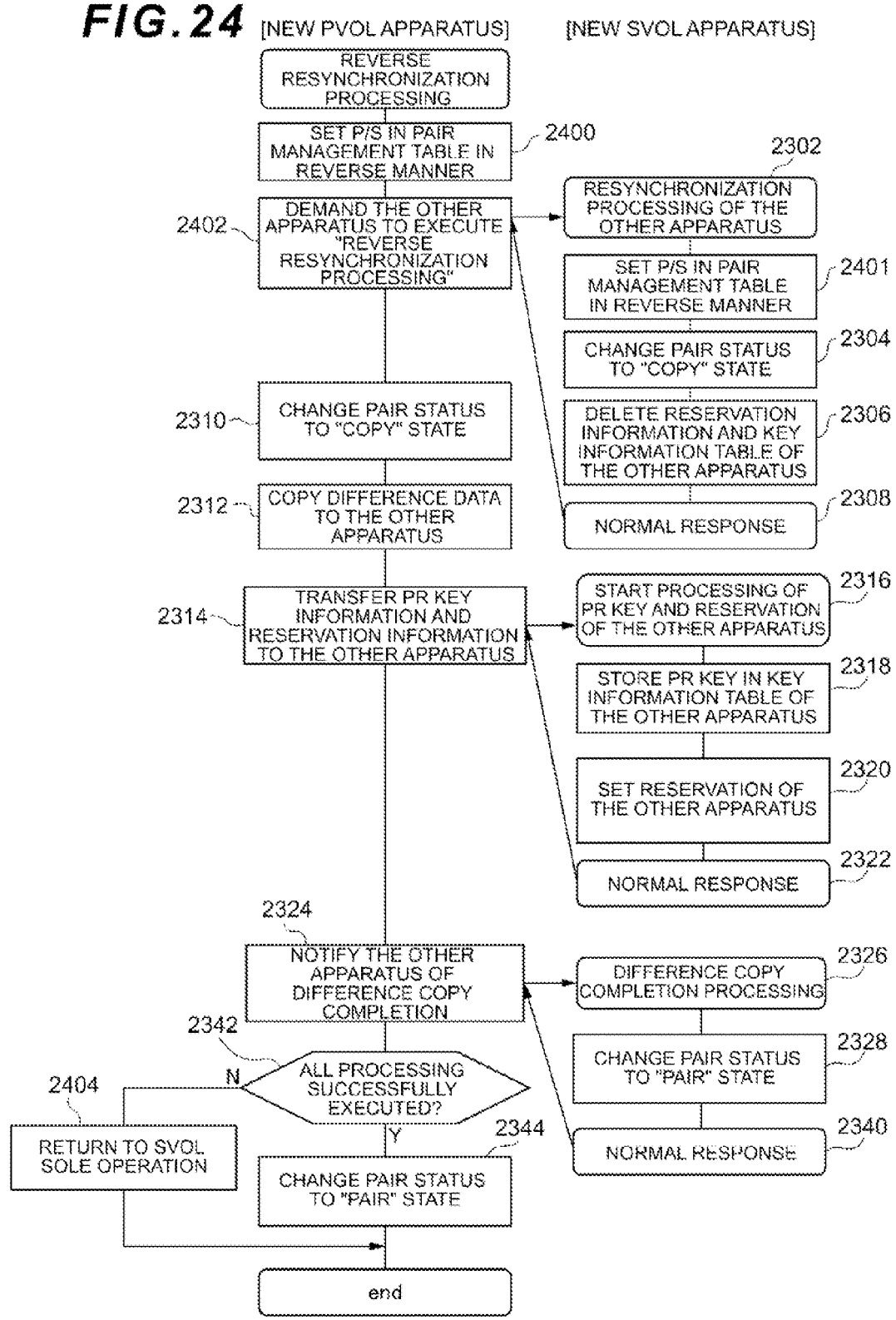
FIG. 24 is a flowchart illustrating reverse resynchronization processing.

FIG. 24 also shows processing for changing the sole operation by the primary volume back to the pair state operation; however, this processing is to change the primary volume to the secondary volume and change the secondary volume to the primary volume, that is, so-called reverse resynchronization for switching between the primary volume and the secondary volume at the time of resynchronization. Referring to FIG. 24, a new PVOL apparatus means the second storage apparatus 10B before the resynchronization and a new SVOL apparatus is the first storage apparatus 10A before the resynchronization.

The difference between this reverse resynchronization and the aforementioned normal resynchronization is that the new primary volume (PVOL) apparatus exists in the second storage apparatus 10B and the new secondary volume (SVOL) apparatus exists in the first storage apparatus 10A and the processing is to switch between primary (P) and secondary (S) in the pair management table (2400, 2402); and that in the reverse resynchronization, the first storage apparatus 10A issues a request to the other apparatus (the second storage apparatus 1B) before the resynchronization (2402). Furthermore, another difference between this reverse resynchronization and the aforementioned normal resynchronization is that if the processing has not terminated normally, the operation of the volume of the second storage apparatus 10B is changed back to the sole operation as the secondary volume (2404). In this case, the normal resynchronization processing is executed, but not the reverse resynchronization. Since other processing steps are the same as those of the aforementioned resynchronization processing, an explanation about them has been omitted.

Figure 25:
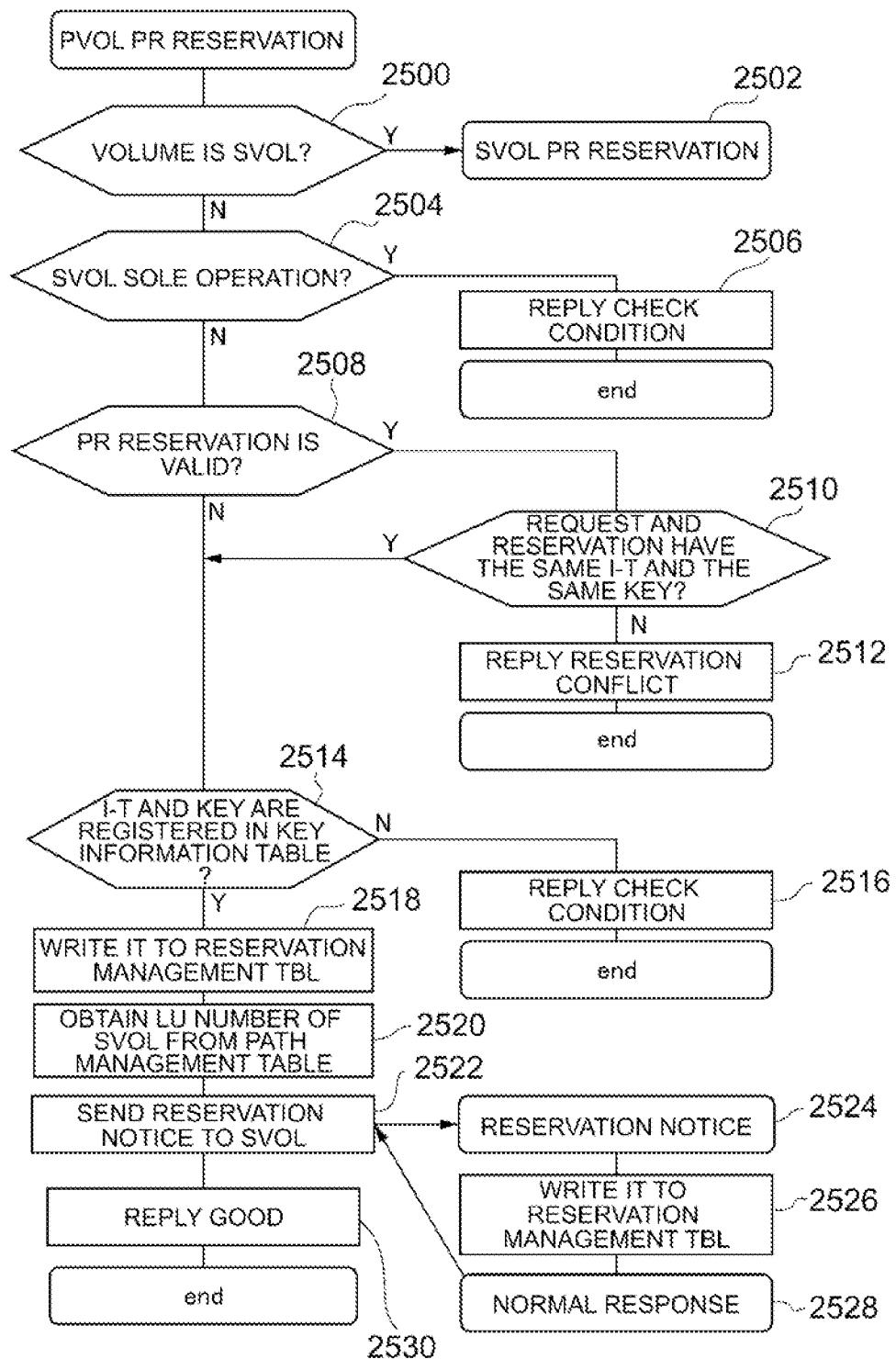
FIG. 25 is a flowchart illustrating processing for securing persistent reservation from the primary volume.

Next, FIG. 25 shows a flowchart illustrating persistent reservation securement processing on the primary volume, which will be explained below. When the first storage apparatus 10A receives a persistent reservation request from the host system, the command control program 12A of the first storage apparatus judges whether the reservation securement target volume is the secondary volume or not (2500). If it is the secondary volume, the persistent reservation securement processing on the secondary volume is executed (2502).

If the relevant volume is not the secondary volume, the pair management program 12C judges whether the secondary volume is in sole operation or not (2504). In the case of the sole operation, it is unnecessary to secure the reservation for the primary volume and the command control program 12A returns an error response to the host system (2506). If the secondary volume is not in sole operation, the reservation management program 12D refers to the reservation management table 14C and checks if a reservation entry exists or not, that is, if the persistent reservation (PR reservation) is valid or not (2508).

If the persistent reservation is valid, the reservation management program 12D judges whether or not the reservation request from the host system and the reservation in the reservation management table 14C have the same I-T and the same key (2510). If a negative judgment is returned, the reservation management program 12D returns an error response to the host system (2512).

If the persistent reservation is not valid and the information of the reservation command matches the management information, the reservation management program 12D judges whether or not the I-T and key are registered in the key information table 14D for its own apparatus. If they do not exist, the reservation management program 12D returns the error response to the host system (2516); and if an affirmative judgment is returned in this step, the reservation management program 12D writes the reservation information, that is, the key information for the primary volume, to the reservation management table 14C (FIG. 7) (2518). The pair management program obtains the ID (LU number) of the logical volume of the secondary volume from the copy pair management table 14B (2520) and the inter-apparatus transfer program 12B notifies the secondary volume of the reservation information (2522) and returns the good response to the host system (2530). When the second storage apparatus 10B receives the reservation information notice (2524), its reservation management program 12D writes the reservation information of the other apparatus (the first storage apparatus 10A) to the reservation management table 14C (2526) and replies the normal response to the first storage apparatus 10A or the host system (2528).

Figure 26:
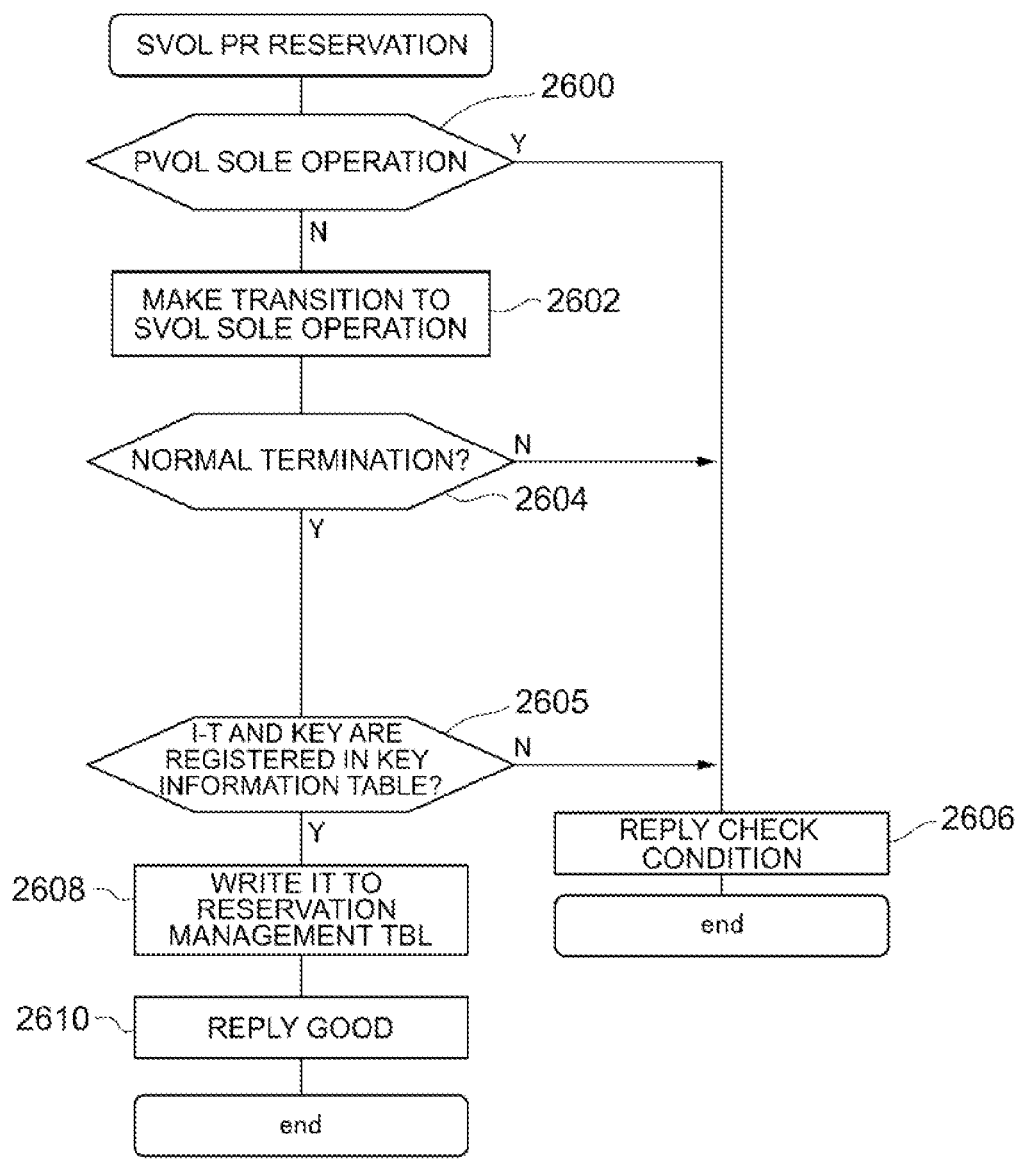
FIG. 26 is a flowchart illustrating reservation securement processing on the secondary volume.

Next, a flowchart illustrating reservation securement processing on the secondary volume will be explained with reference to FIG. 26. When the host system issues a reservation securement request to the secondary volume, the pair management program 12C of the storage apparatus having the secondary volume refers to the pair management table 14B and judges whether the primary volume is in sole operation or not (2600). If an affirmative judgment is returned, the pair management program 12C returns the error response to the host system (2606).

If the primary volume is not in sole operation, the pair management program 12C switches the pair status in the pair management table to the sole operation by the secondary volume (2602). If the pair status has been successfully switched to the sole operation by the secondary volume (affirmative judgment in 2604), the reservation management program 12D judges whether or not the I-T and key are registered in the key information table 14D for its own apparatus (2606). If an affirmative judgment is returned, the reservation management program 12D writes the reservation information to the reservation management table 14C (2608) and returns the good response to the host (2610). Incidentally, if the key for the primary volume is different from the key for the secondary volume, the HAM system will operate in an unexpected manner So, in order to avoid such unexpected operation, it is necessary to perform processing for, for example, periodically sending the reservation management table of its own apparatus to the other apparatus and updating it to the latest information.

Figure 27:
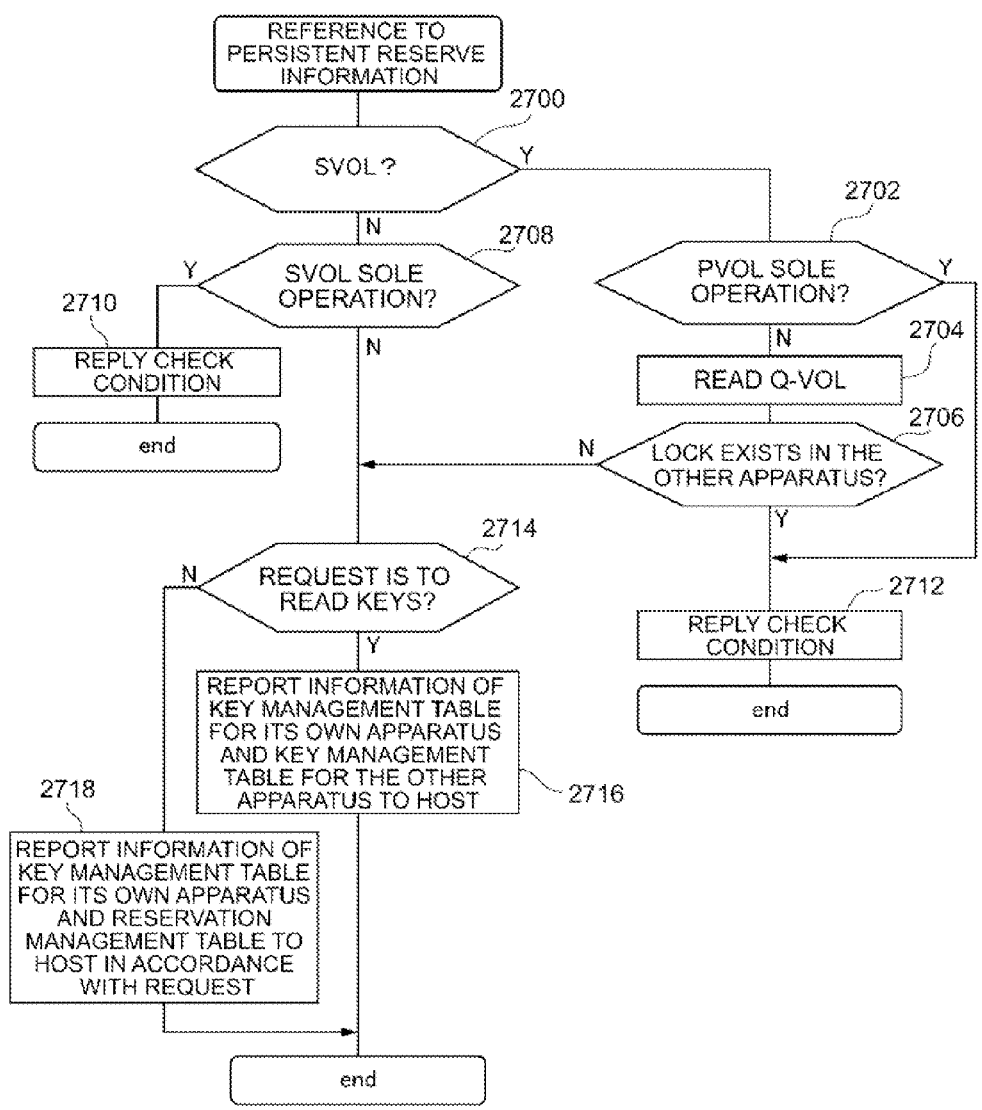
FIG. 27 is a flowchart illustrating processing for reference to persistent reservation information from the host system.

Next, a flowchart illustrating processing for reference to the persistent reservation information from the host system will be explained with reference to FIG. 27. The command control program 12A of the storage apparatus which has received a reference request from the host system judges whether the reference target is the secondary volume or not (2700). If an affirmative judgment is returned, the pair management program 12C judges whether or not the primary volume is in sole operation, by referring to the pair management table (2702). If an affirmative judgment is returned, the pair management program 12C returns the error response to the host system because the host system should not be allowed to reserve the secondary volume (2712). If a negative judgment is returned in this step, the pair management program 12C reads the quorum volume (2704) and checks the lock state (2706). If the lock exists in the other storage apparatus with which the HAM system is configured, accurate data does not exist in the secondary volume, so that the pair management program 12C returns the error response to the host system (2712) in order to prevent the host system from reserving the secondary volume. If the reservation information reference request is not directed to the secondary volume, that is, if the reservation information reference request is directed to the primary volume, the pair management program 12C judges whether or not the secondary volume is in sole operation (2008). If an affirmative judgment is returned, data of the primary volume is not complete, that is, the latest data is not reflected in the primary volume; so, the pair management program 12C replies an error to the host system (2710) in order to prevent the primary volume from being reserved. The reason why the lock is checked in step 2706 is as follows. In a normal operation state, the lock is not obtained. When the own apparatus is the secondary volume and receives a request for reference to the secondary volume, the own apparatus checks the pair status in the pair management table; however, when pair status change notice is not sent from the primary volume due to, for example, a line failure between the primary volume and the secondary volume, the pair status of the secondary volume side remains to be the pair state and, therefore, it is necessary to check with the quorum volume to make sure that the primary volume is not in sole operation.

On the other hand, if the secondary volume is not in sole operation (negative judgment in 2708) or if the lock does not exist in the other apparatus (negative judgment in 2706) and the reservation management program 12D determines that the reservation reference request from the host system is a read key request (2714), the command control program 12A of the storage apparatus which has received the read key request from the host system reports information of the key information table 14D for its own apparatus and the key information table 14E for the other apparatus to the host system (2716); and if the reservation reference request does not include the read key request, the command control program 12A reports the information of the key information table 14D for its own apparatus and the reservation management table 14C, together with the reference request, to the host system (2718). The key information table of the other apparatus is not sent under this circumstance because, when the reservation reference request is not the read key request, only the key information about the port which has received the reservation reference request is required and the key information of the other apparatus is not required.

Figure 28:
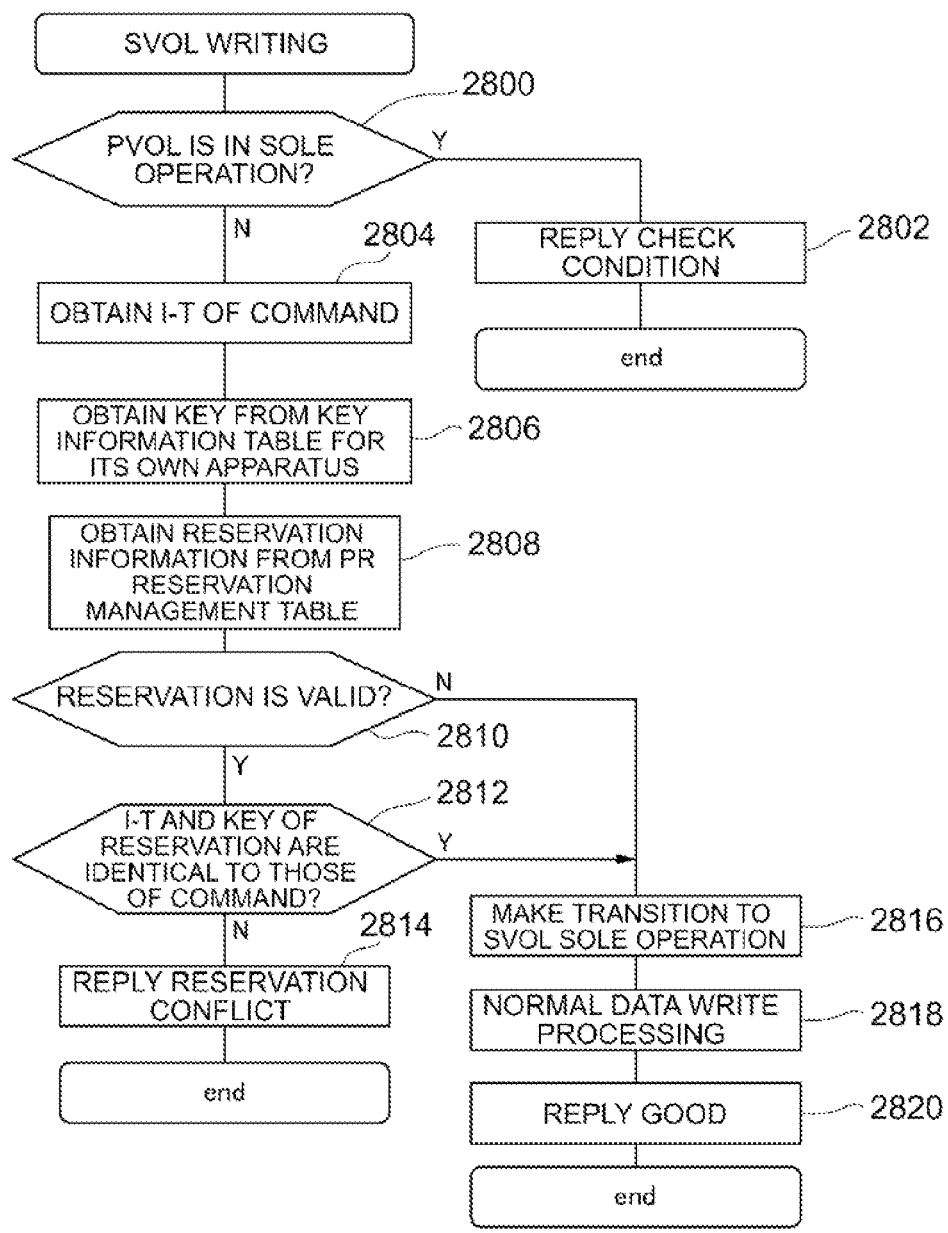
FIG. 28 is a flowchart illustrating write request processing on the secondary volume.

Next, a write request from the host system to the secondary volume will be explained with reference to FIG. 28. The pair management program 12C of the second storage apparatus 10B which has received the write request from the host system judges whether the primary volume is in sole operation or not (2800). If the primary volume is in sole operation, the command control program 12A replies an error to the host system (2802). If the primary volume is not in sole operation, the reservation management program 12D obtains I-T from the write command (2804).

Subsequently, the reservation management program 12D obtains the persistent reservation key from the key information table 14D for its own apparatus (the second storage apparatus 10B) (2806) and obtains the reservation information from the persistent reservation management table 14C (2808). The reservation management program 12D judges whether the reservation is valid or not (2810). If the reservation is not valid and the reservation is valid, and the I-T and key of the reservation management information are identical to those of the read command (2812), the pair management program 12C has the secondary volume make transition to the sole operation (2816) and the command control program 12A executes the normal data write processing (2818) and returns the good response to the host system (2820). If the reservation management information is not identical to the reservation information of the read command, the command control program 12A returns the error response to the host system (2814).

If the reservation is not valid (negative judgment in 2810) or if a combination of the I-T and key of the reservation management information is identical to a combination of the I-T of the path for the write command and the key attached to the write command (affirmative judgment in 2812), the write processing is executed on the secondary volume; and as a result, data of the primary volume is no longer identical to data of the secondary volume and, therefore, the sole operation by the secondary volume is performed. Incidentally, it is necessary to resynchronize the primary volume with the secondary volume in order to synchronously operate the primary volume and the secondary volume.

Figure 29:
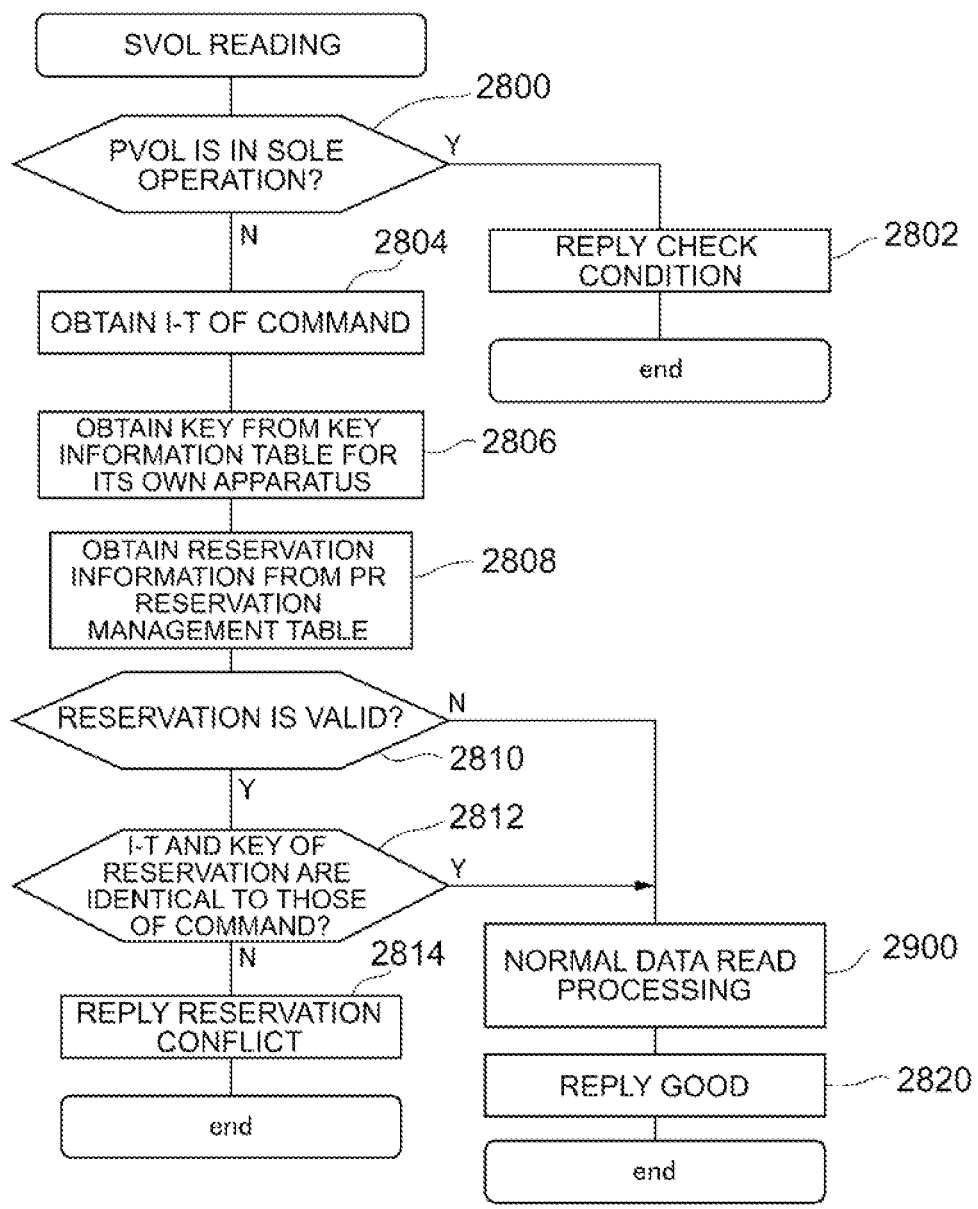
FIG. 29 is a flowchart illustrating read processing on the secondary volume.

Next, FIG. 29 shows a flowchart illustrating read processing on the secondary volume. The only difference between this flowchart and the flowchart illustrating the write processing on the secondary volume (FIG. 289) is that the read processing is executed (2900) without changing the operation status of the secondary volume to the sole operation (step 2816 in FIG. 28).

Figure 30:
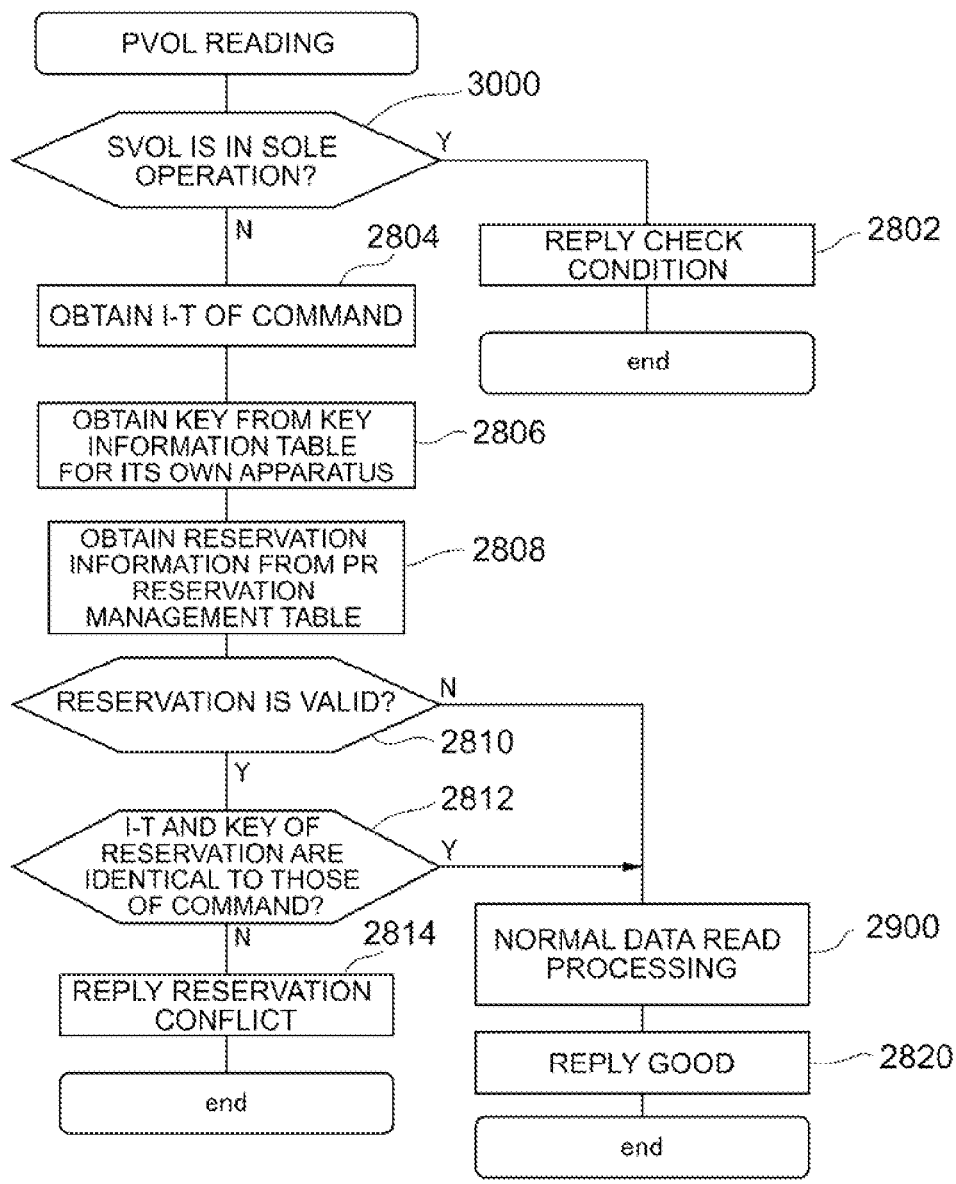
FIG. 30 is a flowchart illustrating read processing on the primary volume.

Subsequently, FIG. 30 shows a flowchart illustrating read processing on the primary volume, which will be explained below. The only difference between this flowchart and the flowchart illustrating the read processing on the secondary volume (FIG. 29) is that the read processing is not executed when the secondary volume is in sole operation (3000).

Figure 31:
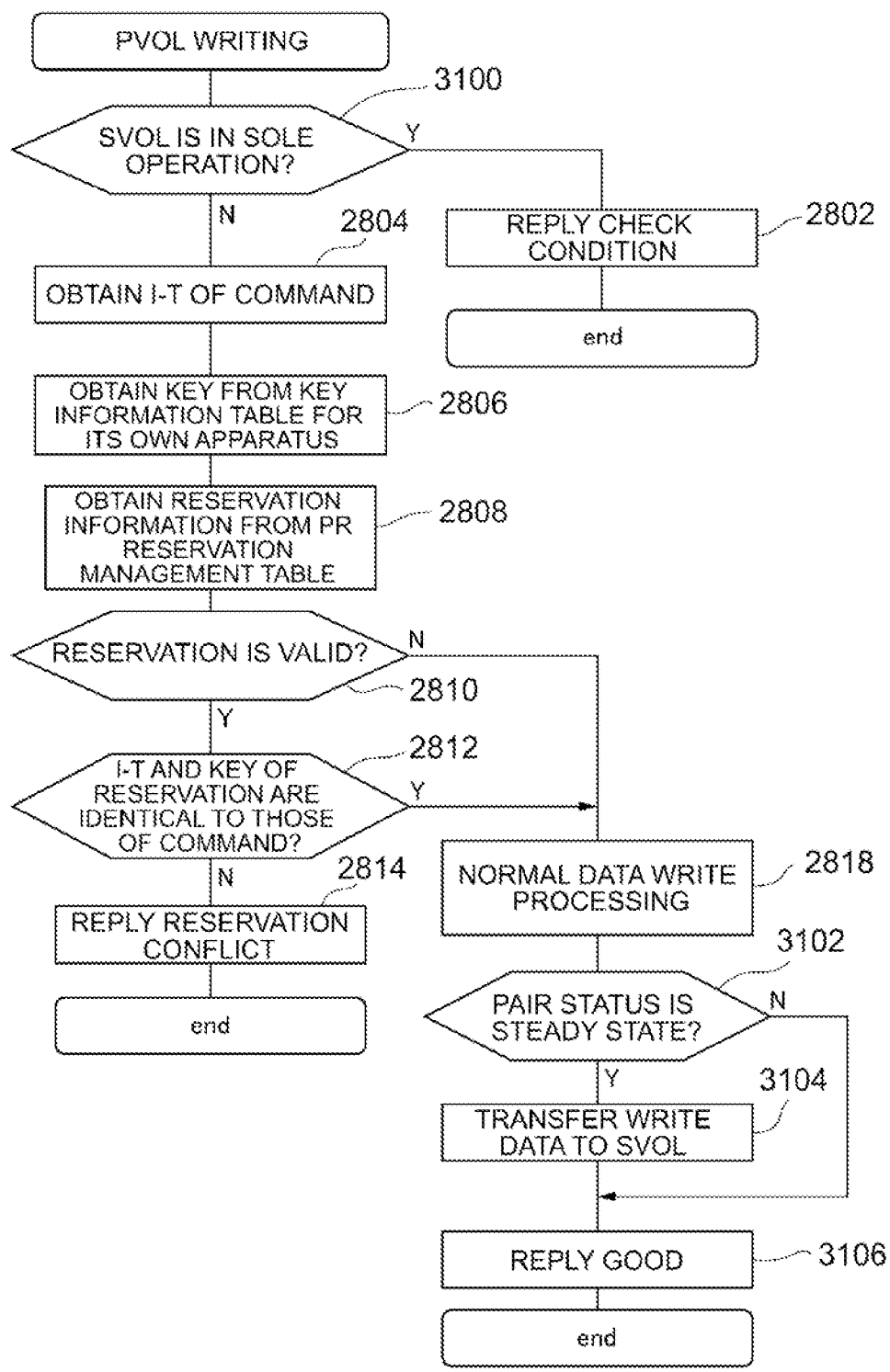
FIG. 31 is a flowchart illustrating write processing on the primary volume.

Next, write processing on the primary volume will be explained with reference to a flowchart in FIG. 31. The difference between this flowchart and the flowchart illustrating the write processing on the secondary volume (FIG. 28) is that: the write processing is not executed during the sole operation by the secondary volume (3100); and if the operation does not make transition to the sole operation by the primary volume after the write processing and the pair status between the primary volume and the secondary volume is the steady state (3102), write data is synchronously copied to the secondary volume (3104).

The invention claimed is:

1. A computer system comprising:
a first storage apparatus;
a second storage apparatus;
a first volume of the first storage apparatus; and
a second volume of the second storage apparatus;
wherein the first volume and the second volume have a copy pair relationship and
a host system recognizes the second volume as the same volume as the first volume; and
wherein the first storage apparatus sends reservation information of the first volume to the second storage apparatus; and
the second storage apparatus controls access from the host system on the basis of the received reservation information;
wherein the reservation information is set by a combination of port information of the host system, port information of the first storage apparatus, and key information.

2. The computer system according to claim 1, wherein when the host system which has set the reservation information to the first storage apparatus accesses the second volume, and
if the key information for reservation information of this access command is consistent with the key information for the reservation information sent from the first storage apparatus, the second storage apparatus permits access from the host system to the second volume even if the sent reservation information is different from the reservation information of the command with respect to the port information.

3. The computer system according to claim 1, wherein if transfer of the reservation information from the first storage apparatus to the second storage apparatus is unsuccessful, the pair relationship between the first volume and the second volume is canceled and sole operation by the first volume is performed.

4. The computer system according to claim 3, wherein the first storage apparatus or the second storage apparatus judges whether data can be written to the first volume or the second volume, in accordance with lock information for a quorum volume.

5. The computer system according to claim 1, wherein when the second storage apparatus receives a command for reserving the second volume from the host system, it judges whether or not the first volume is reserved by the host system, on the basis of information sent from the first storage apparatus; and if an affirmative judgment is returned, the second storage apparatus returns a response to the host system, indicating that the second volume cannot be reserved.

6. The computer system according to claim 1, wherein when the second storage apparatus receives a command for reserving the second volume from the host system, it judges whether or not the first volume is reserved by the host system, on the basis of information sent from the first storage apparatus; and if a negative judgment is returned, the second storage apparatus cancels the pair relationship between the first volume and the second volume, performs sole operation by the second volume, and executes processing for having the host system reserve the second volume.

7. The computer system according to claim 1, wherein when the second storage apparatus receives a read command directed to the second volume from the host system and judges that the first volume and the second volume have a pair relationship and reservation is set from the host system to the second volume, it sends an error response without executing read processing in response to the read command.

8. The computer system according to claim 1, wherein when the second storage apparatus receives a write command directed to the second volume from the host system, it cancels the pair relationship between the first volume and the second volume and makes transition to sole operation by the second volume.

9. The computer system according to claim 1, wherein when the first storage apparatus and the second storage apparatus resynchronize the second volume to the first volume from a sole operation state of the second volume, they set the second volume as a copy source volume and set the first volume as a copy destination volume; and wherein the first storage apparatus deletes information about the reservation of the copy destination volume and the second storage apparatus sends information about the reservation of the copy source volume to the copy destination volume.

* * * * *